United States Patent
Pawlik et al.

(10) Patent No.: US 8,012,647 B2
(45) Date of Patent: Sep. 6, 2011

(54) MEMBRANE-ELECTRODE UNIT AND FUEL ELEMENTS WITH INCREASED SERVICE LIFE

(75) Inventors: Jürgen Pawlik, Battenberg (DE); Oemer Uensal, Mainz (DE); Thomas Schmidt, Frankfurt (DE); Christoph Padberg, Wiesbaden (DE); Glen Hoppes, Frankfurt (DE)

(73) Assignee: BASF Fuel Cell GmbH, Frankfurt (DE)

( * ) Notice: Subject to any disclaimer, the term of this patent is extended or adjusted under 35 U.S.C. 154(b) by 475 days.

(21) Appl. No.: 11/573,105

(22) PCT Filed: Aug. 5, 2005

(86) PCT No.: PCT/EP2005/008487
§ 371 (c)(1),
(2), (4) Date: Jun. 26, 2007

(87) PCT Pub. No.: WO2006/015806
PCT Pub. Date: Feb. 16, 2006

(65) Prior Publication Data
US 2007/0248863 A1    Oct. 25, 2007

(30) Foreign Application Priority Data
Aug. 5, 2004  (EP) .................................. 04018600

(51) Int. Cl.
*H01M 8/10*    (2006.01)
(52) U.S. Cl. ........ 429/509; 429/483; 429/494; 429/306; 429/535; 427/115
(58) Field of Classification Search ............... 429/30, 429/306, 34–39; 427/115
See application file for complete search history.

(56) References Cited

U.S. PATENT DOCUMENTS

| | | | |
|---|---|---|---|
| 4,191,618 A | 3/1980 | Coker et al. | |
| 4,212,714 A | 7/1980 | Coker et al. | |
| 4,333,805 A | 6/1982 | Davidson et al. | |
| 5,464,700 A | 11/1995 | Steck et al. | |
| 6,610,435 B1 * | 8/2003 | Maruyama et al. | 429/34 |
| 6,723,464 B2 * | 4/2004 | Tabata et al. | 429/43 |
| 6,840,969 B2 * | 1/2005 | Kobayashi et al. | 29/623.2 |
| 2003/0232232 A1 * | 12/2003 | Hatano | 429/34 |
| 2005/0014056 A1 * | 1/2005 | Zuber et al. | 429/34 |
| 2006/0008690 A1 * | 1/2006 | Uensal et al. | 429/33 |

(Continued)

FOREIGN PATENT DOCUMENTS

DE    19509748 A1    10/1996

(Continued)

*Primary Examiner* — Melvin Mayes
*Assistant Examiner* — Jun Li
(74) *Attorney, Agent, or Firm* — Hammer & Associates, P.C.

(57) ABSTRACT

The invention relates to a membrane-electrode unit comprising a) two electrochemically active electrodes divided by a polymer electrolytic membrane, wherein the surfaces of said polymer electrolytic membrane are in contact with the electrodes in such a way that the first electrode partially or entirely covers the front side of the polymer electrolytic membrane and the second electrode partially or entirely covers the rear side thereof, b) a sealing material is applied to the front and rear sides of the polymer electrolytic membrane, wherein the polymer electrolytic membrane is provided with one or several recesses and the sealing material applied to the front side of the polymer electrolytic membrane is in contact with the sealing material applied to the rear side thereof. A method for producing said membrane-electrode unit and fuel cells provided therewith are also disclosed.

15 Claims, 3 Drawing Sheets

U.S. PATENT DOCUMENTS

Figure 1:
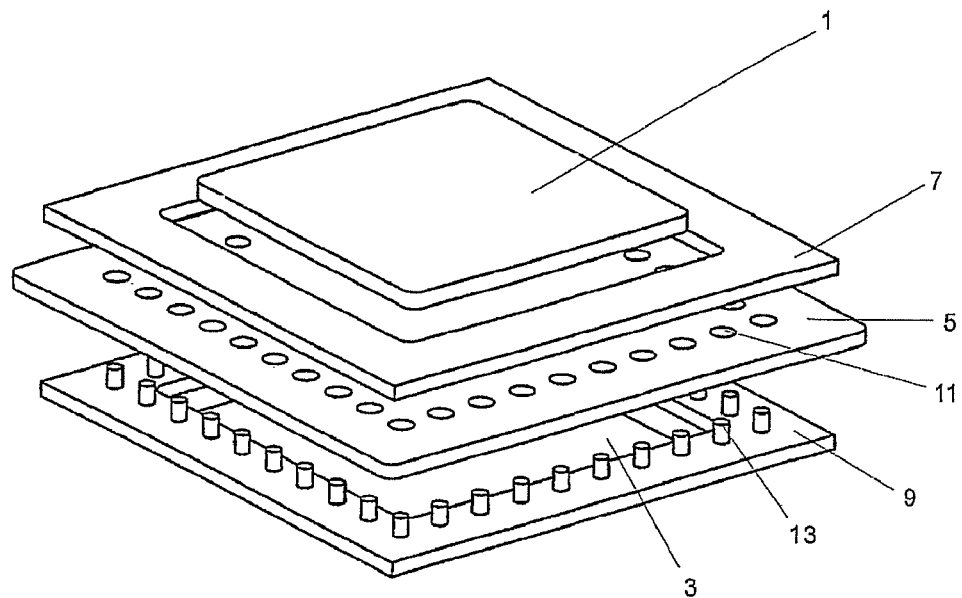

2006/0014065 A1 * 1/2006 Pawlik et al. .................. 429/30

FOREIGN PATENT DOCUMENTS

| DE | 19509749 A1 | 10/1996 |
| --- | --- | --- |
| DE | 19757492 A1 | 7/1999 |
| DE | 10052242 A1 | 5/2002 |
| DE | 10109829 A1 | 9/2002 |
| DE | 10110752 A1 | 9/2002 |
| DE | 10140147 A1 | 3/2003 |
| DE | 10209419 A1 | 9/2003 |
| DE | 10213540 A1 | 2/2004 |
| DE | 10235360 A * | 2/2004 |
| DE | 10235360 A1 | 2/2004 |
| DE | 10246459 * | 4/2004 |
| DE | 10246461 A1 | 4/2004 |
| EP | 1073690 A1 | 10/1999 |
| EP | 1357622 * | 10/2003 |
| JP | A-2001-196082 | 7/2001 |
| WO | WO 92/15121 | 9/1992 |
| WO | WO 96/13872 | 5/1996 |
| WO | WO 97/20358 A | 6/1997 |
| WO | WO 00/26982 | 5/2000 |
| WO | WO 00/44816 | 8/2000 |
| WO | WO 01/18894 A2 | 3/2001 |

* cited by examiner

MEMBRANE-ELECTRODE UNIT AND FUEL ELEMENTS WITH INCREASED SERVICE LIFE

The present invention relates to membrane electrode units and to fuel cells with an increased service life, which comprise two electrochemically active electrodes separated by a polymer electrolyte membrane.

In polymer electrolyte membrane (PEM) fuel cells, the proton-conducting membranes used at present are almost always polymers modified with sulfonic acids. The polymers employed are predominantly perfluorinated polymers. One prominent example is Nafion™ from DuPont de Nemours, Wilmington USA. Proton conduction requires a relatively high water content in the membrane, typically of 4-20 molecules of water per sulfonic acid group. The necessary water content, but also the stability of the polymer in conjunction with acidic water and the reaction gases (hydrogen and oxygen), limits the operating temperature of the PEM fuel cell stack usually to 80-100° C. The operating temperatures can be increased to >120° C. under pressure. Otherwise, higher operating temperatures are impossible to achieve without a loss of fuel cell performance. At temperatures which for a given pressure level lie above the dew point of water, the membrane dries out completely and the fuel cell no longer supplies any electrical energy, since the resistance of the membrane rises to levels so high that there is no longer any significant current flow.

A membrane electrode unit with integrated seal which is based on the technology outlined above is described for example in U.S. Pat. No. 5,464,700. Here, films of elastomers are provided in the outer region of the membrane electrode unit on the areas of the membrane not covered by the electrodes, which films at the same time form the seal to the bipolar plates and to the exterior.

This measure makes it possible to achieve a saving in terms of very costly Nafion® membrane material. Further advantages obtained by virtue of this construction relate to the contamination of the membrane. An improvement in long-term stability is not illustrated in U.S. Pat. No. 5,464,700. This is also apparent from the very low operating temperatures. In the description of the invention disclosed in U.S. Pat. No. 5,464,700, it is pointed out that the operating temperature of the cell is limited to temperatures of less than or equal to 80° C. The technique described therein is thus not suitable for fuel cells with operating temperatures above 100° C.

For technical reasons associated with the system, however, operating temperatures higher than 100° C. in the fuel cell are desirable. The activity of the noble-metal-based catalysts contained in the membrane electrode unit (MEU) is much better at high operating temperatures. Especially when using so-called reformates, comprising hydrocarbons, the reformer gas contains significant quantities of carbon monoxide, which usually have to be removed by complex gas processing or gas purification. At high operating temperatures, there is a rise in the tolerance of the catalysts for the CO impurities.

Furthermore, heat is produced during the operation of fuel cells. However, cooling of these systems to below 80° C. can be very complicated. Depending on performance output, the cooling devices can be made much simpler in terms of design. This means that much better use can be made of the waste heat in fuel cell systems which are operated at temperatures above 100° C., and thus the efficiency of the fuel cell system can be increased by power/heat coupling.

In order to achieve these temperatures, membranes featuring new conductivity mechanisms are generally used. One approach to this is the use of membranes which exhibit electrical conductivity without the use of water. The first promising development in this direction is outlined in the document WO 96/13872.

Said document also describes a first method for producing membrane electrode units. Here, two electrodes are pressed onto the membrane, each of them covering only part of the two main faces of the membrane. A PTFE seal is pressed onto the remaining free part of the main faces of the membrane in the cell, so that the gas spaces of anode and cathode are sealed off from one another and from the environment.

Another high-temperature fuel cell is disclosed in document JP-A-2001-196082. Said document discloses a membrane electrode unit which is provided with a polyimide seal. One problem with this construction, however, is that two membranes are required for sealing, between which a polyimide gasket is provided. Since the thickness of the membrane has to be selected to be as small as possible for technical reasons, the thickness of the gasket between the two membranes described in JP-A-2001-196082 is extremely limited. In long-term tests it has been found that such a construction is likewise not stable for a period of more than 1000 hours.

The document DE 10235360 discloses a membrane electrode unit which contains polyimide layers for sealing purposes. These polyimide layers may optionally be provided with fluoropolymers in order to improve contact and in this way further increase the long-term stability of the membrane electrode unit.

The aforementioned membrane electrode units are generally bonded with planar bipolar plates in which channels for a gas flow are milled. Since the membranes sometimes have a greater thickness than the seals described above, a further seal is inserted between the seal of the membrane electrode units and the bipolar plates, said further seal usually being made of PTFE.

It has now been found that the service life of the previously described fuel cells is limited.

The object of the present invention was therefore to provide improved membrane electrode units and fuel cells operated therewith, which should preferably have the following properties:

The fuel cells should have as long a service life as possible.

The fuel cells should be able to be used at operating temperatures which are as high as possible, in particular above 100° C.

During operation, the individual cells should exhibit the same or improved performance for as long a time as possible.

After a long operating time, the fuel cells should have an open circuit voltage that is as high as possible and a gas crossover that is as low as possible. They should also be able to be operated with a stoichiometry that is as low as possible.

The fuel cells should as far as possible run without additional moistening of the combustion gases.

The membrane electrode units should be able to withstand continuous or changing pressure differences between anode and cathode in the best possible manner.

In particular, the membrane electrode units should be robust against different operating conditions (T, p, geometry, etc.), in order to increase the general reliability in the best possible manner.

The membrane electrode units should be able to be produced in a simple manner, in large scales and cost-effectively.

These objects are achieved by membrane electrode units having all the features of the present invention set out below.

The subject matter of the present invention is accordingly a membrane electrode unit comprising a) two electrochemically active electrodes separated by a polymer electrolyte membrane, wherein the surfaces of the polymer electrolyte membrane are in contact with the electrodes in such a way that the first electrode partially or completely, preferably only partially, covers the front side of the polymer electrolyte membrane and the second electrode partially or completely, preferably only partially, covers the rear side of the polymer electrolyte membrane,
b) sealing material on the front side and rear side of the polymer electrolyte membrane, wherein the polymer electrolyte membrane has one or more recesses and the sealing material on the front side of the polymer electrolyte membrane is in contact with the sealing material on the rear side of the polymer electrolyte membrane.

Polymer electrolyte membranes which are suitable for the purposes of the present invention are known per se and are in principle not subject to any restriction. Rather, all proton-conducting materials are suitable. However, preference is given to using membranes comprising acids, wherein the acids may be covalently bonded to polymers. Furthermore, a sheet-like material can be doped with an acid to form a suitable membrane. It is also possible to use gels, in particular polymer gels, as membranes, wherein polymer membranes which are particularly suitable for the present purposes are described for example in DE 102 464 61.

These membranes can be produced inter alia by swelling sheet-like materials, for example a polymer film, with a liquid comprising acid-containing compounds, or by producing a mixture of polymers and acid-containing compounds and then forming a membrane by shaping a sheet-like article and then hardening to form a membrane.

The polymers suitable for this include inter alia polyolefins, such as poly(chloroprene), polyacetylene, polyphenylene, poly(p-xylylene), polyarylmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene (PTFE), polyhexafluoropropylene, copolymers of PTFE with hexafluoropropylene, with perfluoropropyl vinyl ether, with trifluoronitrosomethane, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular derived from norbornene;

polymers having C—O bonds in the backbone, for example polyacetal, polyoxymethylene, polyethers, polypropylene oxide, polyepichlorohydrin, polytetrahydrofuran, polyphenylene oxide, polyether ketone, polyesters, in particular polyhydroxyacetic acid, polyethylene terephthalate, polybutylene terephthalate, polyhydroxybenzoate, polyhydroxypropionic acid, polypivalolactone, polycaprolactone, polymalonic acid, polycarbonate;

polymers having C—S bonds in the backbone, for example polysulfide ether, polyphenylene sulfide, polysulfones, polyether sulfone;

polymers having C—N bonds in the backbone, for example polyimines, polyisocyamides, polyetherimine, poiyetherimides, polyaniline, polyaramides, polyamides, polyhydrazides, polyurethanes, polyimides, polyazoles, polyazole ether ketone, polyazines;

liquid-crystalline polymers, in particular Vectra™, and inorganic polymers, for example polysilanes, polycarbosilanes, polysiloxanes, polysilicic acid, polysilicates, silicones, polyphosphazines and polythiazyl.

Here, preference is given to basic polymers, wherein this applies in particular in respect of membranes doped with acids. Suitable basic polymer membranes doped with acid include almost all known polymer membranes where the protons can be transported. Preference is given here to acids which are able to convey protons without additional water, for example by means of the so-called Grotthus mechanism.

As basic polymer within the context of the present invention, use will preferably be made of a basic polymer having at least one nitrogen, oxygen or sulfur atom, preferably at least one nitrogen atom, in a repeating unit. Preference is also given to basic polymers which comprise at least one heteroaryl group.

According to one preferred embodiment, the repeating unit in the basic polymer contains an aromatic ring having at least one nitrogen atom. The aromatic ring is preferably a five- or six-membered ring having one to three nitrogen atoms, which may be fused to another ring, in particular another aromatic ring.

According to one particular aspect of the present invention, use is made of polymers which are stable at high temperature and which contain at least one nitrogen, oxygen and/or sulfur atom in one or in different repeating units.

Within the context of the present invention, a polymer which is stable at high temperature is a polymer which can be operated continuously as the polymeric electrolyte in a fuel cell at temperatures above 120° C. Continuously means that a membrane according to the invention can be operated for at least 100 hours, preferably at least 500 hours, at a temperature of at least 80° C., preferably at least 120° C., particularly preferably at least 160° C., without more than a 50% reduction in performance with respect to the initial performance, which performance can be measured in accordance with the method described in WO 01/18894 A2.

Within the context of the present invention, all the aforementioned polymers can be used individually or as a blend. Here, particular preference is given to blends which contain polyazoles and/or polysulfones. The preferred blend components here are polyether sulfone, polyether ketone and polymers modified with sulfonic acid groups, as described in German patent applications DE 100 522 42 and DE 102 464 61. By using blends, it is possible to improve the mechanical properties and reduce the material costs.

Polymer blends which comprise at least one basic polymer and at least one acidic polymer, preferably in a weight ratio of 1:99 to 99:1 (so-called acid/base polymer blends) have also proven to be particularly useful for the purposes of the present invention. In this connection, particularly suitable acidic polymers comprise polymers which contain sulfonic acid groups and/or phosphonic acid groups. Acid/base polymer blends which are very particularly suitable according to the invention are described in detail for example in the document EP1073690 A1.

A particularly preferred group of basic polymers is that of the polyazoles. A basic polymer based on polyazole contains repeating azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

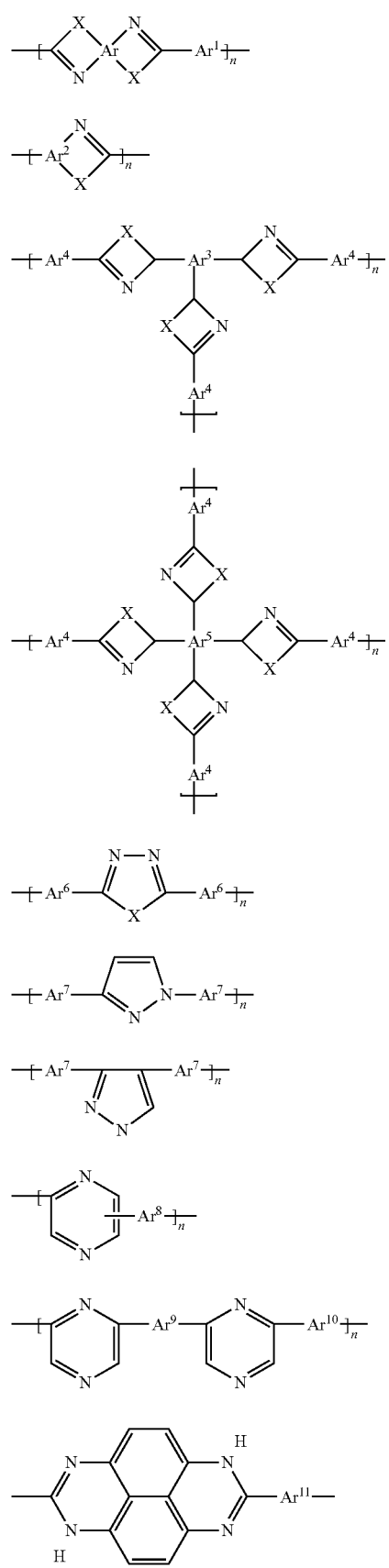
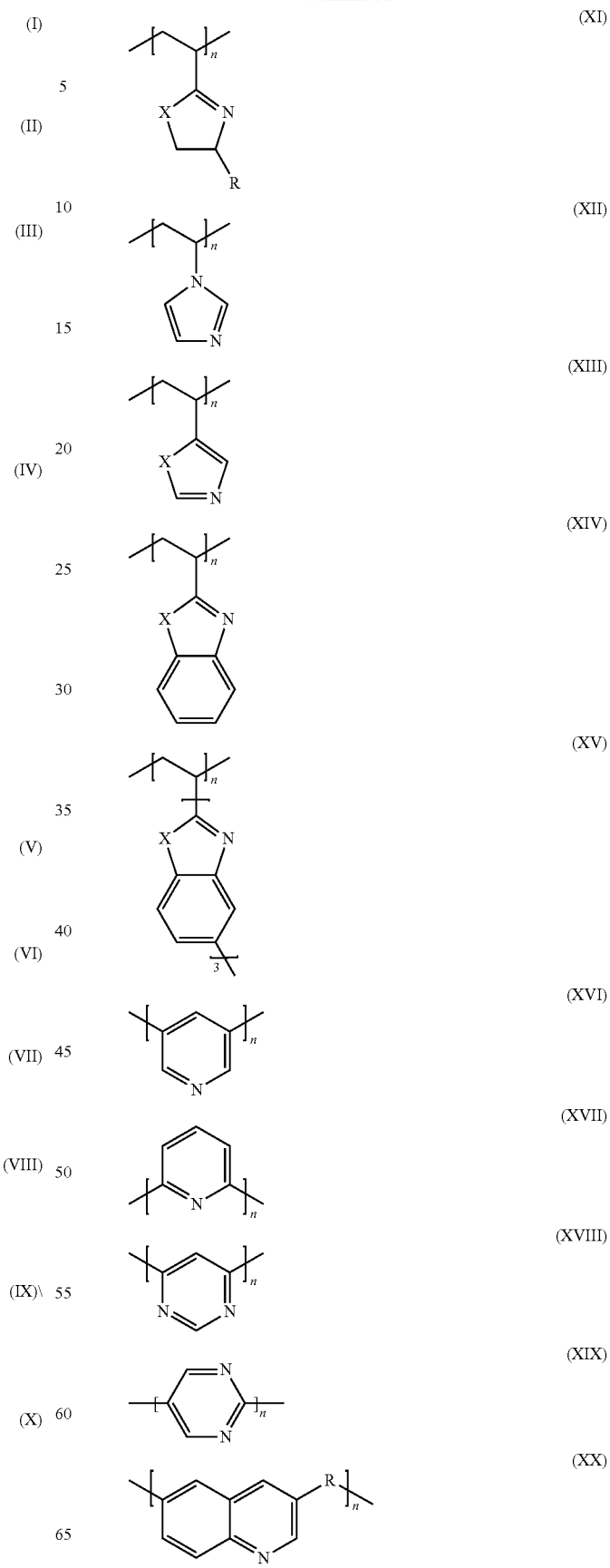

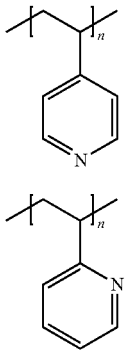

in which
Ar are the same or different and are a tetravalent aromatic or heteroaromatic group which may be mono- or polynuclear,
$Ar^1$ are the same or different and are each a divalent aromatic or heteroaromatic group which may be mono- or polynuclear,
$Ar^2$ are the same or different and are a di- or trivalent aromatic or heteroaromatic group which may be mono- or polynuclear,
$Ar^3$ are the same or different and are a trivalent aromatic or heteroaromatic group which may be mono- or polynuclear,
$Ar^4$ are the same or different and are a trivalent aromatic or heteroaromatic group which may be mono- or polynuclear,
$Ar^5$ are the same or different and are a tetravalent aromatic or heteroaromatic group which may be mono- or polynuclear,
$Ar^6$ are the same or different and are a divalent aromatic or heteroaromatic group which may be mono- or polynuclear,
$Ar^7$ are the same or different and are a divalent aromatic or heteroaromatic group which may be mono- or polynuclear,
$Ar^8$ are the same or different and are a trivalent aromatic or heteroaromatic group which may be mono- or polynuclear,
$Ar^9$ are the same or different and are a di- or tri- or tetravalent aromatic or heteroaromatic group which may be mono- or polynuclear,
$Ar^{10}$ are the same or different and are a di- or trivalent aromatic or heteroaromatic group which may be mono- or polynuclear,
$Ar^{11}$ are the same or different and are a divalent aromatic or heteroaromatic group which may be mono- or polynuclear,
X are the same or different and are oxygen, sulfur or an amino group which bears a hydrogen atom, a group having 1-20 carbon atoms, preferably a branched or unbranched alkyl or alkoxy group, or an aryl group as further radical,
R in all formulae except formula (XX) is the same or different and is hydrogen, an alkyl group or an aromatic group, and in formula (XX) is an alkylene group or an aromatic group, and
n, m are each a whole number greater than or equal to 10, preferably greater than or equal to 100.

Preferred aromatic or heteroaromatic groups derive from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, each of which may optionally also be substituted.

In this case, $Ar^1, Ar^4, Ar^6, Ar^7, Ar^8, Ar^9, Ar^{10}, Ar^{11}$ can have any substitution pattern; in the case of phenylene, for example, $Ar^1, Ar^4, Ar^6, Ar^7, Ar^8, Ar^9, Ar^{10}, Ar^{11}$ can be ortho- meta- and para-phenylene. Particularly preferred groups derive from benzene and biphenylene, each of which may optionally also be substituted.

Preferred alkyl groups are short-chain alkyl groups having 1 to 4 carbon atoms, such as methyl, ethyl, n-propyl or iso-propyl and t-butyl groups.

Preferred aromatic groups are phenyl or naphthyl groups. The alkyl groups and the aromatic groups may be substituted.

Preferred substituents are halogen atoms such as e.g. fluorine, amino groups, hydroxyl groups or short-chain alkyl groups such as e.g. methyl or ethyl groups.

Preference is given to polyazoles containing repeating units of the formula (I) in which the radicals X are the same within a repeating unit.

The polyazoles may in principle also contain different repeating units, which differ for example in their radical X. Preferably, however, there are only the same radicals X in one repeating unit.

Further preferred polyazole polymers are polyimidazoles, polybenzothiazoles, polybenzoxazoles, polyoxadiazoles, polyquinoxalines, polythiadiazoles, poly (pyridines), poly (pyrimidines), and poly(tetrazapyrenes).

In another embodiment of the present invention, the polymer containing repeating azole units is a copolymer or a blend containing at least two units of the formula (I) to (XXII) which are different from one another. The polymers may be in the form of block copolymers (diblock, triblock), statistical copolymers, periodic copolymers and/or alternating polymers.

In one particularly preferred embodiment of the present invention, the polymer containing repeating azole units is a polyazole containing only units of the formula (I) and/or (II).

The number of repeating azole units in the polymer is preferably a whole number greater than or equal to 10. Particularly preferred polymers contain at least 100 repeating azole units.

Within the context of the present invention, preference is given to polymers containing repeating benzimidazole units. Some examples of the extremely advantageous polymers containing repeating benzimidazole units are shown by the formulae below:

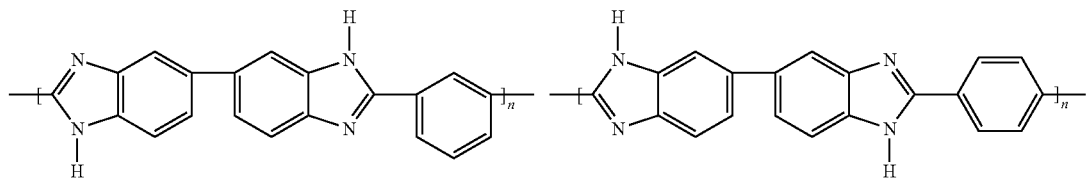

-continued
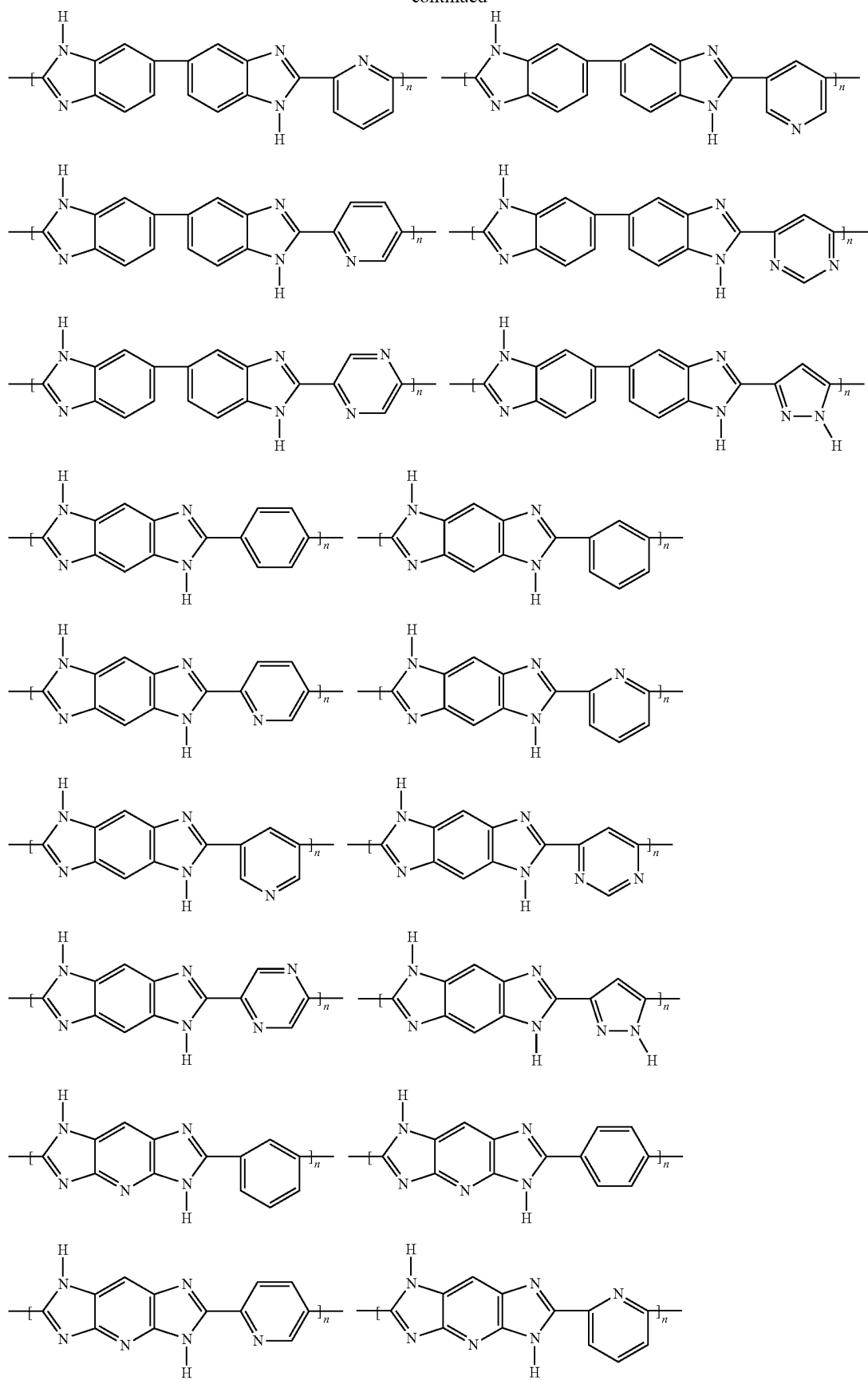

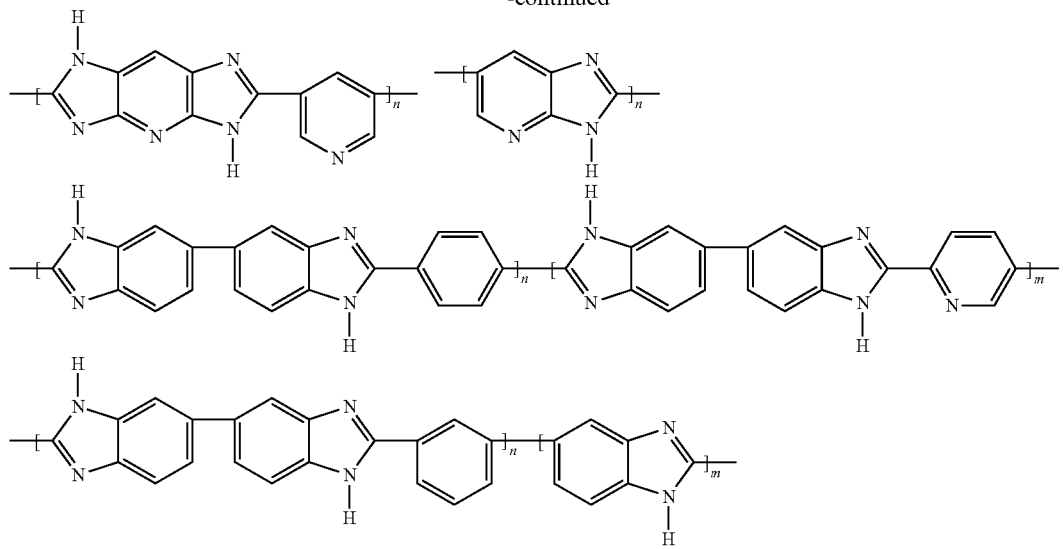

in which n and m are each a whole number greater than or equal to 10, preferably greater than or equal to 100.

The polyazoles used, but in particular the polybenzimidazoles, are characterized by a high molecular weight. Measured as the intrinsic viscosity, this is at least 0.2 dl/g, preferably from 0.8 to 10 dl/g, in particular from 1 to 10 dl/g.

The preparation of such polyazoles is known, wherein one or more aromatic tetraamino compounds are reacted in the melt with one or more aromatic carboxylic acids and/or esters thereof containing at least two acid groups per carboxylic acid monomer, to form a prepolymer. The resulting prepolymer solidifies in the reactor and is subsequently mechanically comminuted. The pulverulent prepolymer is usually end-polymerized in a solid-phase polymerization at temperatures of up to 400° C.

The preferred aromatic carboxylic acids include, inter alia, dicarboxylic acids and tricarboxylic acids and tetracarboxylic acids and/or the esters or anhydrides or acid chlorides thereof. The term "aromatic carboxylic acids" also encompasses heteroaromatic carboxylic acids.

The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene -3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, 2,2-bis(4-carboxyphenyl) hexafluoropropane, 4,4'-stilbenedicarboxylic acid, 4-carboxycinnamic acid, and the C1-C20 alkyl esters or C5-C12 aryl esters thereof, or the acid anhydrides thereof or the acid chlorides thereof.

The aromatic tri- and tetracarboxylic acids and/or the C1-C20 alkyl esters or C5-C12 aryl esters thereof or the acid anhydrides or acid chlorides thereof are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid or 3,5,4'-biphenyltricarboxylic acid.

The aromatic tetracarboxylic acids and/or the C1-C20 alkyl esters or C5-C12 aryl esters thereof or the acid anhydrides or acid chlorides thereof are preferably 3,5,3',5'-biphenyltetracarboxylic acid, 1,2,4,5-benzenetetracarboxylic acid, benzophenonetetracarboxylic acid, 3,3',4,4'-diphenyltetracarboxylic acid, 2,2',3,3'-biphenyltetracarboxylic acid, 1,2,5,6-naphthalenetetracarboxylic acid or 1,4,5,8-naphthalenetetracarboxylic acid.

The heteroaromatic carboxylic acids used are preferably heteroaromatic dicarboxylic acids or tricarboxylic acids or tetracarboxylic acids or the esters or anhydrides thereof. Heteroaromatic carboxylic acids are understood to mean aromatic systems which contain at least one nitrogen, oxygen, sulfur or phosphorus atom in the aromatic moiety. The compounds in question are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid or benzimidazole-5,6-dicarboxylic acid, or the C1-C20 alkyl esters or C5-C12 aryl esters thereof or the acid anhydrides or acid chlorides thereof.

The amount of tricarboxylic acid and/or tetracarboxylic acids (based on dicarboxylic acid used) is between 0 and 30 mol %, preferably 0.1 and 20 mol %, in particular 0.5 and 10 mol %.

The aromatic and heteroaromatic diaminocarboxylic acids used are preferably diaminobenzoic acid or the mono- and dihydrochloride derivatives thereof.

Preference will be given to using mixtures of at least 2 different aromatic carboxylic acids. With particular preference, use is made of mixtures which, in addition to aromatic carboxylic acids, also contain heteroaromatic carboxylic acids. The mixing ratio of aromatic carboxylic acids to heteroaromatic carboxylic acids is between 1:99 and 99:1, preferably from 1:50 to 50:1.

These mixtures are, in particular, mixtures of N-heteroaromatic dicarboxylic acids and aromatic dicarboxylic acids. Non-limiting examples thereof are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether 4,4'-dicarboxylic acid, benzophenone-4,4'-dicarboxylic acid, diphenyl sulfone 4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid and 2,5-pyrazinedicarboxylic acid.

The preferred aromatic tetraamino compounds include, inter alia, 3,3',4,4'-tetraaminobiphenyl, 2,3,5,6-tetraaminopyridine, 1,2,4,5-tetraaminobenzene, 3,3',4,4'-tetraaminodiphenyl sulfone, 3,3',4,4'-tetraaminodiphenyl ether, 3,3',4,4'-tetraaminobenzophenone, 3,3',4,4'-tetraaminodiphenylmethane and 3,3',4,4'-tetraaminodiphenyldimethylmethane and also the salts thereof, in particular the mono-, di-, tri- and tetrahydrochloride derivatives thereof.

Preferred polybenzimidazoles are commercially available under the trade name ®Celazole from Celanese AG.

The preferred polymers include polysulfones, in particular polysulfones having aromatic and/or heteroaromatic groups in the backbone. According to a particular aspect of the present invention, preferred polysulfones and polyether sulfones have a melt volume rate MVR 300/21.6 of less than or equal to 40 cm$^3$/10 min, in particular less than or equal to 30 cm$^3$/10 min and particularly preferably less than or equal to 20 cm$^3$/10 min, measured in accordance with ISO 1133. Polysulfones having a Vicat softening temperature VST/A/50 of from 180° C. to 230° C. are preferred here. In another preferred embodiment of the present invention, the number-average molecular weight of the polysulfones is greater than 30 000 g/mol.

The polymers based on polysulfone include, in particular, polymers which contain repeating units with linking sulfone groups according to general formulae A, B, C, D, E, F and/or G:

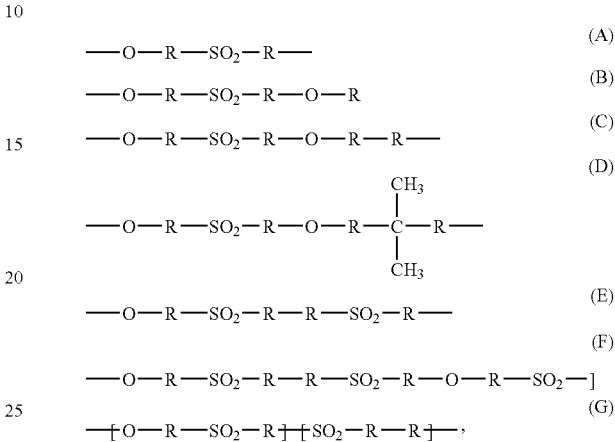

in which the radicals R independently of one another are identical or different and are an aromatic or heteroaromatic group, said radicals having been described in more detail above. They include, in particular, 1,2-phenylene, 1,3-phenylene, 1,4-phenylene, 4,4'-biphenyl, pyridine, quinoline, naphthalene, phenanthrene.

The polysulfones which are preferred within the context of the present invention include homopolymers and copolymers, for example statistical copolymers. Particularly preferred polysulfones comprise repeating units of the formulae H to N:

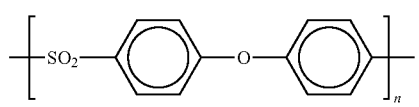

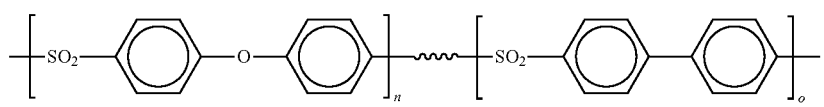

where n > o

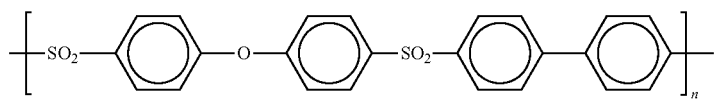

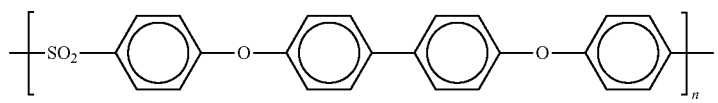

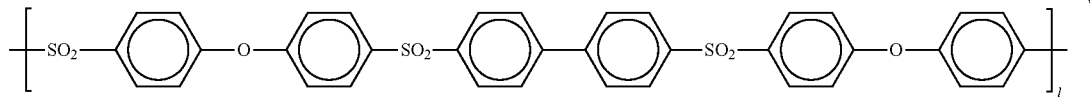

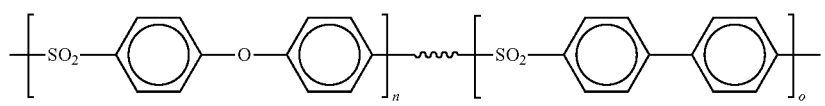
(M)

where n < o

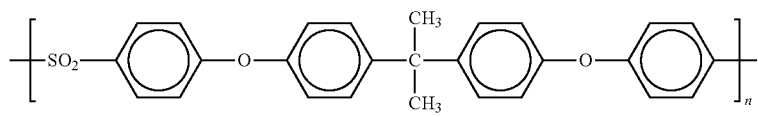
(N)

The previously described polysulfones are commercially available under the trade names ®Victrex 200 P, ®Victrex 720 P, ®Ultrason E, ®Ultrason S, ®Mindel, ®Radel A, ®Radel R, ®Victrex HTA, ®Astrel and ®Udel.

Particular preference is also given to polyether ketones, polyether ketone ketones, polyether ether ketones, polyether ether ketone ketones and polyaryl ketones. These high-performance polymers are known per se and are commercially available under the trade names Victrex® PEEK™, ®Hostatec, ®Kadel.

In order to produce polymer films, a polymer, preferably a polyazole, is dissolved in a further step in polar aprotic solvents, such as dimethylacetamide (DMAc) for example, and a film is produced by conventional methods.

In order to remove solvent residues, the resulting film can be treated with a washing liquid as in German patent application DE 101 098 29. As a result of cleaning the polyazole film to remove solvent residues, as described in the German patent application, the mechanical properties of the film are surprisingly improved. These properties include in particular the modulus of elasticity, the tear strength and the fracture toughness of the film.

The polymer film may additionally have further modifications, for example by crosslinking, as described in German patent application DE 101 107 52 or in WO 00/44816. In one preferred embodiment, the polymer film used, comprising a basic polymer and at least one blend component, additionally comprises a crosslinker as described in German patent application 101 401 47.

The thickness of the polyazole films may lie within wide ranges. The thickness of the polyazole film prior to doping with acid preferably lies in the range from 5 μm to 2000 μm, particularly preferably in the range from 10 μm to 1000 μm, without this being intended to represent any limitation.

In order to obtain proton conductivity these films are doped with an acid Acids in this context include all known Lewis and Brønsted acids, preferably inorganic Lewis and Brønsted acids.

Also possible, furthermore, is the use of polyacids, in particular isopolyacids and heteropolyacids, and mixtures of different acids. For the purposes of the present invention, heteropolyacids are inorganic polyacids having at least two different central atoms, which are formed as partial mixed anhydrides from in each case weak polybasic oxo acids of a metal (preferably Cr, Mo, V, W) and of a nonmetal (preferably As, I, P, Se, Si, Te). They include, inter alia, 12-molybdatophosphoric acid and 12-tungstophosphoric acid.

The degree of doping can be used to influence the conductivity of the polyazole film. The conductivity increases as the concentration of dopant increases, until a maximum value is reached.

According to the invention, the degree of doping is given as moles of acid per mole repeating unit of the polymer. Within the context of the present invention, preference is given to a degree of doping of between 3 and 80, advantageously between 5 and 60, in particular between 12 and 60.

Particularly preferred dopants are sulfuric acid and phosphoric acid, or compounds which release these acids, for example during hydrolysis. An especially preferred dopant is phosphoric acid ($H_3PO_4$). Highly concentrated acids are generally used here. According to one particular aspect of the present invention, the concentration of the phosphoric acid is at least 50% by weight, in particular at least 80% by weight, based on the weight of the dopant.

Proton-conducting membranes can also be obtained by a method comprising the following steps
I) dissolving polymers, in particular polyazoles, in polyphosphoric acid,
II) heating the solution obtainable according to step I) under inert gas to temperatures of up to 400° C.,
III) forming a membrane using the solution of the polymer according to step II) on
IV) treating the membrane formed in step III) until it is self-supporting.

Further details relating to such proton-conducting membranes can be found for example in DE 102 464 61. They are obtainable for example under the trade name Celtec®.

Furthermore, doped polyazole films can be obtained by a method comprising the following steps
A) mixing one or more aromatic tetraamino compounds with one or more aromatic carboxylic acids and/or esters thereof containing at least two acid groups per carboxylic acid monomer, or mixing one or more aromatic and/or heteroaromatic diaminocarboxylic acids in polyphosphoric acid to form a solution and/or dispersion,
B) applying a layer using the mixture according to step A) to a support or to an electrode,
C) heating the sheet-like structure/layer obtainable according to step B) under inert gas to temperatures of up to 350° C., preferably up to 280° C., to form the polyazole polymer,
D) treating the membrane formed in step C) (until it is self-supporting).

Further details relating to such proton-conducting membranes can be found for example in DE 102 464 59. They are obtainable for example under the trade name Celtec®.

The aromatic and/or heteroaromatic carboxylic acid and tetraamino compounds to be used in step A) have been described above.

The polyphosphoric acid used in step A) comprises commercially customary polyphosphoric acids such as are obtainable for example from Riedel-de Haen. The polyphosphoric acids $H_{n+2}P_nO_{3n+1}$ (n>1) normally have a content, calculated as $P_2O_5$ (by acidimetry), of at least 83%. Instead of a solution of the monomers, it is also possible to produce a dispersion/suspension.

The mixture produced in step A) has a weight ratio of polyphosphoric acid to the sum of all the monomers of from 1:10 000 to 10 000:1, preferably from 1:1000 to 1000:1, in particular from 1:100 to 100:1.

The layer formation according to step B) takes place by means of measures known per se (casting, spraying, knife-coating) which are known from the prior art relating to polymer film production. Suitable supports are all supports which can be referred to as inert under the conditions. In order to adjust the viscosity, phosphoric acid (concentrated phosphoric acid, 85%) may optionally be added to the solution. As a result, the viscosity can be adjusted to the desired value and the formation of the membrane can be made easier.

The layer produced according to step B) has a thickness of between 20 and 4000 µm, preferably between 30 and 3500 µm, in particular between 50 and 3000 µm.

Where the mixture according to step A) also includes tricarboxylic acids and/or tetracarboxylic acids, this produces branching/crosslinking in the polymer formed. This helps to improve the mechanical property.

Treatment of the polymer layer produced according to step C) in the presence of moisture at temperatures and for a duration sufficient for the layer to have sufficient strength for use in fuel cells. Treatment may be carried out to the point where the membrane is self-supporting, so that it can be detached without damage from the support.

According to step C), the sheet-like structure obtained in step B) is heated to a temperature of up to 350° C., preferably up to 280° C. and particularly preferably in the range from 200° C. to 250° C. The inert gases to be used in step C) are known in the art. They include, in particular, nitrogen and also noble gases, such as neon, argon and helium.

In one variant of the method, the formation of oligomers and/or polymers may be brought about simply by heating the mixture from step A) to temperatures of up to 350° C., preferably up to 280° C. Depending on the chosen temperature and duration, it is possible subsequently to omit some or all of the heating in step C). This variant also forms the subject matter of the present invention.

The treatment of the membrane in step D) takes place at temperatures above 0° C. and below 150° C., preferably at temperatures between 10° C. and 120° C., in particular between room temperature (20° C.) and 90° C., in the presence of moisture and/or water and/or water vapor and/or water-containing phosphoric acid of up to 85%. The treatment preferably takes place under atmospheric pressure, but may also take place under the effect of pressure. The important thing is that the treatment takes place in the presence of sufficient moisture, as a result of which the polyphosphoric acid present undergoes partial hydrolysis to form low molecular mass polyphosphoric acid and/or phosphoric acid so as to strengthen the membrane.

The partial hydrolysis of the polyphosphoric acid in step D) leads to a strengthening of the membrane and to a decrease in the layer thickness and the formation of a membrane having a thickness of between 15 and 3000 µm, preferably between 20 and 2000 µm, in particular between 20 and 1500 µm, which is self-supporting.

The intramolecular and intermolecular structures (interpenetrating networks, IPN) present in the polyphosphoric acid layer according to step B) lead in step C) to an ordered membrane formation, which is responsible for the particular properties of the membrane formed.

The upper temperature limit of the treatment according to step D) is generally 150° C. In the case of extremely short moisture exposure, for example exposure to superheated steam, this steam may also be hotter than 150° C. The key to the upper temperature limit is the duration of the treatment.

The partial hydrolysis (step D) may also take place in climatically controlled chambers in which the hydrolysis can be specifically controlled under defined moisture exposure. The humidity in this case can be set specifically by means of the temperature and/or saturation of the contacting environment, for example gases such as air, nitrogen, carbon dioxide or other suitable gases, or steam. The duration of treatment is dependent on the parameters chosen above.

The duration of treatment is also dependent on the thickness of the membrane.

In general, the duration of treatment is between a few seconds to minutes, in the case of exposure to superheated steam for example, or up to whole days, for example in air at room temperature with low relative atmospheric humidity. The duration of treatment is preferably between 10 seconds and 300 hours, in particular from 1 minute to 200 hours.

If the partial hydrolysis is carried out at room temperature (20° C.) with ambient air having a relative atmospheric humidity of 40-80%, the duration of treatment is between 1 and 200 hours.

The membrane obtained according to step D) can be designed so as to be self-supporting, i.e. it can be detached from the support without damage and may optionally then be directly processed further.

The degree of hydrolysis, i.e., the duration, temperature and ambient humidity, can be used to adjust the concentration of phosphoric acid and thus the conductivity of the polymer membrane. The concentration of the phosphoric acid is specified as moles of acid per mole of repeating unit of the polymer. By means of the method comprising steps A) to D), it is possible to obtain membranes having a particularly high phosphoric acid concentration. Preference is given to a concentration (moles of phosphoric acid per repeating unit of the formula (I), for example polybenzimidazole) of between 10 and 50, in particular between 12 and 40. Such high degrees of doping (concentrations) are very difficult if not impossible to obtain by doping polyazoles with commercially available ortho-phosphoric acid.

According to one modification of the described method, in which doped polyazole films are produced by using polyphosphoric acid, these films can also be produced by a method comprising the following steps 1) reacting one or more aromatic tetraamino compounds with one or more aromatic carboxylic acids and/or esters thereof containing at least two acid groups per carboxylic acid monomer, or one or more aromatic and/or heteroaromatic diaminocarboxylic acids in the melt at temperatures of up to 350° C., preferably up to 300° C.,
2) dissolving the solid prepolymer obtained according to step 1) in polyphosphoric acid,
3) heating the solution obtainable according to step 2) under inert gas to temperatures of up to 300° C., preferably up to 280° C., to form the dissolved polyazole polymer,
4) forming a membrane using the solution of the polyazole polymer according to step 3) on a support, and
5) treating the membrane formed in step 4) until it is self-supporting.

The method steps set out under points 1) to 5) were discussed in more detail above in relation to steps A) to D), to which reference is made, particularly in respect of preferred embodiments.

Further details relating to such proton-conducting membranes can be found for example in DE 102 464 59. They are obtainable for example under the trade name Celtec®.

In a further preferred embodiment of the present invention, use is made of membranes comprising polymers which are derived from monomers containing phosphonic acid groups and/or monomers containing sulfonic acid groups, and which are obtainable for example under the trade name Celtec®.

These proton-conducting polymer membranes are obtainable inter alia by a method described for example in DE 102 135 40, comprising the following steps
A) preparing a mixture comprising monomers containing phosphonic acid groups and at least one polymer,
B) applying a layer using the mixture according to step A) to a support,
C) polymerizing the monomers containing phosphonic acid groups which are present in the sheet-like structure obtainable according to step B).

Such proton-conducting polymer membranes are also obtainable by a method described for example in DE 102 094 19, comprising the following steps
I) swelling a polymer film with a liquid which contains monomers containing phosphonic acid groups, and
II) polymerizing at least some of the monomers containing phosphonic acid groups that were introduced into the polymer film in step I).

Swelling is understood to mean an increase in weight of the film by at least 3% by weight. The swelling is preferably at least 5%, particularly preferably at least 10%.

The swelling Q is determined gravimetrically from the mass of the film before swelling $m_0$ and the mass of the film after the polymerization in step B), $m_2$.

$$Q = (m_2 - m_0)/m_0 \times 100$$

Swelling is preferably carried out at a temperature above 0° C., in particular between room temperature (20° C.) and 180° C., in a liquid which contains preferably at least 5% by weight of monomers containing phosphonic acid groups. Swelling can also be carried out at superatmospheric pressure. The limits here are imposed by economic considerations and technical possibilities.

The polymer film used for swelling generally has a thickness in the range from 5 to 3000 μm, preferably from 10 to 1500 μm. The production of such films from polymers is generally known, and some are commercially available. The term polymer film means that the film used for swelling comprises polymers containing sulfonic acid groups, wherein this film may contain further customary additives.

The preparation of the films and preferred polymers, in particular polyazoles and/or polysulfones, were described above.

The liquid which contains monomers containing phosphonic acid groups and/or monomers containing sulfonic acid groups may be a solution, wherein the liquid may also contain suspended and/or dispersed constituents. The viscosity of the liquid which contains monomers containing phosphonic acid groups may lie within wide ranges, wherein an addition of solvents or an increase in temperature may take place in order to adjust the viscosity. The dynamic viscosity is preferably in the range from 0.1 to 10 000 mPa*s, in particular from 0.2 to 2000 mPa*s, wherein these values can be measured for example in accordance with DIN 53015.

Monomers containing phosphonic acid groups and/or monomers containing sulfonic acid groups are known in the art. These are compounds which have at least one carbon-carbon double bond and at least one phosphonic acid group. The two carbon atoms which form the carbon-carbon double bond preferably have at least two, preferably 3, bonds to groups which lead to low steric hindrance of the double bond. Such groups include, inter alia, hydrogen atoms and halogen atoms, in particular fluorine atoms. Within the context of the present invention, the polymer containing phosphonic acid groups is the polymerization product obtained by polymerization of the monomer containing phosphonic acid groups either alone or with further monomers and/or crosslinkers.

The monomer containing phosphonic acid groups may have one, two, three or more carbon-carbon double bonds. Furthermore, the monomer containing phosphonic acid groups may contain one, two, three or more phosphonic acid groups.

In general, the monomer containing phosphonic acid groups contains 2 to 20, preferably 2 to 10, carbon atoms.

The monomer containing phosphonic acid groups which is used to produce the polymers containing phosphonic acid groups is preferably a compound of the formula

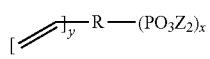

in which
R is a bond, a divalent C1-C15 alkylene group, a divalent C1-C15 alkylenoxy group, for example an ethyleneoxy group, or a divalent C5-C20 aryl or heteroaryl group, the aforementioned radicals in turn optionally being substituted by halogen, —OH, COOZ, —CN, $NZ_2$,
Z are each, independently of one another, hydrogen, a C1-C15 alkyl group, a C1-C15 alkoxy group, an ethyleneoxy group or a C5-C20 aryl or heteroaryl group, the aforementioned radicals in turn optionally being substituted by halogen, —OH, —CN, and
x is a whole number 1, 2, 3, 4, 5, 6, 7, 8, 9 or 10,
y is a whole number 1, 2, 3, 4, 5, 6, 7, 8, 9 or 10
and/or of the formula

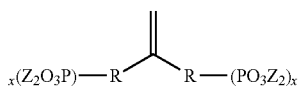

in which
R is a bond, a divalent C1-C15 alkylene group, a divalent C1-C15 alkylenoxy group, for example an ethyleneoxy group, or a divalent C5-C20 aryl or heteroaryl group, the aforementioned radicals in turn optionally being substituted by halogen, —OH, COOZ, —CN, $NZ_2$,
Z are each, independently of one another, hydrogen, a C1-C15 alkyl group, a C1-C15 alkoxy group, for example an ethyleneoxy group, or a C5-C20 aryl or heteroaryl group, the aforementioned radicals in turn optionally being substituted by halogen, —OH, —CN, and
X is a whole number 1, 2, 3, 4, 5, 6, 7, 8, 9 or 10
and/or of the formula

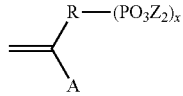

in which
A is a group of formula $COOR^2$, CN, $CONR^2_2$, $OR^2$ and/or $R^2$, $R^2$ is hydrogen, a C1-C15 alkyl group, a C1-C15 alkoxy group, for example an ethyleneoxy group, or a C5-C20 aryl or heteroaryl group, the aforementioned radicals in turn optionally being substituted by halogen, —OH, COOZ, —CN, $NZ_2$, R is a bond, a divalent C1-C15 alkylene group, a divalent C1-C15 alkylenoxy group, for example an ethyleneoxy group, or a divalent C5-C20 aryl or heteroaryl group, the aforementioned radicals in turn optionally being substituted by halogen, —OH, COOZ, —CN, $NZ_2$, Z are each, independently of one another, hydrogen, a C1-C15 alkyl group, a C1-C15 alkoxy group, an ethyleneoxy group or a C5-C20 aryl or heteroaryl group, the aforementioned radicals in turn optionally being substituted by halogen, —OH, —CN, and x is a whole number 1, 2, 3, 4, 5, 6, 7, 8, 9 or 10.

The preferred monomers containing phosphonic acid groups include, inter alia, alkenes containing phosphonic acid groups, such as ethenephosphonic acid, propenephosphonic acid, butenephosphonic acid; acrylic acid and/or methacrylic acid compounds containing phosphonic acid groups, such as for example 2-phosphonomethylacrylic acid, 2-phosphonomethylmethacrylic acid, 2-phosphonomethylacrylamide and 2-phosphonomethylmethacrylamide.

With particular preference, use is made of commercially available vinylphosphonic acid (ethenephosphonic acid), obtainable for example from Aldrich or Clariant GmbH. A preferred vinylphosphonic acid has a purity of more than 70%, in particular 90% and particularly preferably more than 97%.

Furthermore, the monomers containing phosphonic acid groups can also be used in the form of derivatives which can subsequently be converted into the acid, wherein the conversion into the acid can also be carried out in the polymerized state. These derivatives include in particular the salts, esters, amides and halides of the monomers containing phosphonic acid groups.

The liquid used preferably comprises at least 20% by weight, in particular at least 30% by weight and particularly preferably at least 50% by weight, based on the total weight of the mixture, of monomers containing phosphonic acid groups and/or monomers containing sulfonic acid groups.

The liquid used may additionally contain further organic and/or inorganic solvents. The organic solvents include, in particular, polar aprotic solvents such as dimethyl sulfoxide (DMSO), esters such as ethyl acetate, and polar protic solvents such as alcohols, such as ethanol, propanol, isopropanol and/or butanol. The inorganic solvents include, in particular, water, phosphoric acid and polyphosphoric acid.

These can have a positive influence on the processability. In particular, the incorporation of the monomer into the film can be improved by adding the organic solvent. The content of monomers containing phosphonic acid groups and/or monomers containing sulfonic acid groups in such solutions is generally at least 5% by weight, preferably at least 10% by weight, particularly preferably between 10 and 97% by weight.

Monomers containing sulfonic acid groups are known in the art. These are compounds which have at least one carbon-carbon double bond and at least one sulfonic acid group. The two carbon atoms which form the carbon-carbon double bond preferably have at least two, preferably 3, bonds to groups which lead to low steric hindrance of the double bond. Such groups include, inter alia, hydrogen atoms and halogen atoms, in particular fluorine atoms. Within the context of the present invention, the polymer containing sulfonic acid groups is the polymerization product obtained by polymerization of the monomer containing sulfonic acid groups either alone or with further monomers and/or crosslinkers.

The monomer containing sulfonic acid groups may have one, two, three or more carbon-carbon double bonds. Furthermore, the monomer containing sulfonic acid groups may contain one, two, three or more sulfonic acid groups.

In general, the monomer containing sulfonic acid groups contains 2 to 20, preferably 2 to 10, carbon atoms.

The monomer containing sulfonic acid groups is preferably a compound of the formula

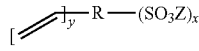

in which

R is a bond, a divalent C1-C15 alkylene group, a divalent C1-C15 alkylenoxy group, for example an ethyleneoxy group, or a divalent C5-C20 aryl or heteroaryl group, the aforementioned radicals in turn optionally being substituted by halogen, —OH, COOZ, —CN, $NZ_2$, Z are each, independently of one another, hydrogen, a C1-C15 alkyl group, a C1-C15 alkoxy group, for example an ethyleneoxy group, or a C5-C20 aryl or heteroaryl group, the aforementioned radicals in turn optionally being substituted by halogen, —OH, —CN, and x is a whole number 1, 2, 3, 4, 5, 6, 7, 8, 9 or 10, y is a whole number 1, 2, 3, 4, 5, 6, 7, 8, 9 or 10 and/or of the formula

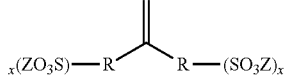

in which

R is a bond, a divalent C1-C15 alkylene group, a divalent C1-C15 alkylenoxy group, for example an ethyleneoxy group, or a divalent C5-C20 aryl or heteroaryl group, the aforementioned radicals in turn optionally being substituted by halogen, —OH, COOZ, —CN, $NZ_2$, Z are each, independently of one another, hydrogen, a C1-C15 alkyl group, a C1-C15 alkoxy group, for example an ethyleneoxy group, or a C5-C20 aryl or heteroaryl group, the aforementioned radicals in turn optionally being substituted by halogen, —OH, —CN, and X is a whole number 1, 2, 3, 4, 5, 6, 7, 8, 9 or 10 and/or of the formula

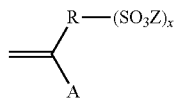

in which

A is a group of formula $COOR^2$, CN, $CONR^2_2$, $OR^2$ and/or $R^2$, $R^2$ is hydrogen, a C1-C15 alkyl group, a C1-C15 alkoxy group, for example an ethyleneoxy group, or a C5-C20 aryl or heteroaryl group, the aforementioned radicals in turn optionally being substituted by halogen, —OH, COOZ, —CN, $NZ_2$, R is a bond, a divalent C1-C15 alkylene group, a divalent C1-C15 alkylenoxy group, for example an ethyleneoxy group, or a divalent C5-C20 aryl or heteroaryl group, the aforementioned radicals in turn optionally being substituted by halogen, —OH, COOZ, —CN, $NZ_2$, Z are each, independently of one another, hydrogen, a C1-C15 alkyl group, a C1-C15 alkoxy group, for example an ethyleneoxy group, or a C5-C20 aryl or heteroaryl group, the aforementioned radicals in turn optionally being substituted by halogen, —OH, —CN, and x is a whole number 1, 2, 3, 4, 5, 6, 7, 8, 9 or 10.

The preferred monomers containing sulfonic acid groups include, inter alia, alkenes which contain sulfonic acid groups, such as ethenesulfonic acid, propenesulfonic acid, butenesulfonic acid; acrylic acid and/or methacrylic acid compounds which contain sulfonic acid groups, such as for example 2-sulfonomethylacrylic acid, 2-sulfonomethylmethacrylic acid, 2-sulfonomethylacrylamide and 2-sulfonomethylmethacrylamide.

With particular preference, use is made of commercially available vinylsulfonic acid (ethenesulfonic acid), as obtainable for example from Aldrich or Clariant GmbH. A preferred vinylsulfonic acid has a purity of more than 70%, in particular 90% and particularly preferably more than 97% purity.

Furthermore, the monomers containing sulfonic acid groups can also be used in the form of derivatives which can subsequently be converted into the acid, wherein the conversion into the acid can also be carried out in the polymerized state. These derivatives include in particular the salts, esters, amides and halides of the monomers containing sulfonic acid groups.

According to one particular aspect of the present invention, the weight ratio of monomers containing sulfonic acid groups to monomers containing phosphonic acid groups may lie in the range from 100:1 to 1:100, preferably 10:1 to 1:10 and particularly preferably 2:1 to 1:2. According to a further particular aspect of the present invention, monomers containing phosphonic acid groups are preferred over monomers containing sulfonic acid groups. Accordingly, use is particularly preferably made of a liquid which contains monomers containing phosphonic acid groups.

In a further embodiment of the invention, monomers capable of crosslinking can be used in the production of the polymer membrane. These monomers may be added to the liquid used to treat the film. The monomers capable of crosslinking may also be applied to the flat structure after treatment with the liquid. The monomers capable of crosslinking are in particular compounds which contain at least 2 carbon-carbon double bonds. Preference is given to dienes, trienes, tetraenes, dimethylacrylates, trimethylacrylates, tetramethylacrylates, diacrylates, triacrylates and tetraacrylates.

Particular preference is given to dienes, trienes, tetraenes of the formula

dimethylacrylates, trimethylacrylates, tetramethylacrylates of the formula

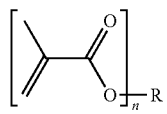

diacrylates, triacrylates, tetraacrylates of the formula

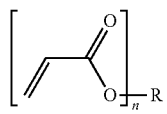

in which

R is a C1-C15 alkyl group, a C5-C20 aryl or heteroaryl group, NR', —SO$_2$, PR', Si(R')$_2$, wherein the aforementioned radicals may in turn be substituted, R' are each, independently of one another, hydrogen, a C1-C15 alkyl group, a C1-C15 alkoxy group, a C5-C20 aryl or heteroaryl group, and n is at least 2.

The substituents of the above radical R are preferably halogen, hydroxyl, carboxy, carboxyl, carboxyl ester, nitrile, amine, silyl or siloxane radicals.

Particularly preferred crosslinkers are allyl methacrylate, ethylene glycol dimethacrylate, diethylene glycol dimethacrylate, triethylene glycol dimethacrylate, tetra- and polyethylene glycol dimethacrylate, 1,3-butanediol dimethacrylate, glycerol dimethacrylate, diurethane dimethacrylate, trimethylpropane trimethacrylate, epoxy acrylates, for example ebacryl, N',N-methylenebisacrylamide, carbinol, butadiene, isoprene, chloroprene, divinylbenzene and/or bisphenol-A-dimethylacrylate. These compounds are commercially available for example from Sartomer Company Exton, Pennsylvania under the names CN-120, CN104 and CN-980.

The use of crosslinkers is optional, wherein these compounds can usually be used in the range between 0.05 to 30% by weight, preferably 0.1 to 20% by weight, particularly preferably 1 to 10% by weight, based on the weight of the monomers containing phosphonic acid groups.

The liquid which contains monomers containing phosphonic acid groups and/or monomers containing sulfonic acid groups may be a solution, wherein the liquid may also contain suspended and/or dispersed constituents. The viscosity of the liquid which contains monomers containing phosphonic acid groups and/or monomers containing sulfonic acid groups may lie within wide ranges, wherein it is possible to add solvents or to increase the temperature in order to adjust the viscosity. The dynamic viscosity preferably lies in the range from 0.1 to 10 000 mPa*s, in particular 0.2 to 2000 mPa*s, wherein these values can be measured for example in accordance with DIN 53015.

A membrane, in particular a polyazole-based membrane, can also be crosslinked at the surface by the effect of heat in the presence of atmospheric oxygen. This hardening of the membrane surface further improves the properties of the membrane. To this end, the membrane may be heated to a temperature of at least 150° C., preferably at least 200° C. and particularly preferably at least 250° C. The oxygen concentration in this method step usually lies in the range from 5 to 50% by volume, preferably 10 to 40% by volume, without this being intended to represent any limitation.

The crosslinking may also take place by exposure to IR or NIR (IR=infrared, i.e. light with a wavelength of more than 700 nm; NIR=near–IR, i.e. light with a wavelength in the range from approx. 700 to 2000 nm or an energy in the range from approx. 0.6 to 1.75 eV). Another method is exposure to β-rays. The radiation dose here is between 5 and 200 kGy.

Depending on the desired degree of crosslinking, the duration of the crosslinking reaction may lie within a wide range. In general, this reaction time lies in the range from 1 second to 10 hours, preferably 1 minute to 1 hour, without this being intended to represent any limitation.

According to the invention, the membrane electrode unit comprises at least two electrochemically active electrodes (anode and cathode) separated by the polymer electrolyte membrane. The term "electrochemically active" indicates that the electrodes are capable of catalyzing the oxidation of hydrogen and/or at least one reformate and the reduction of oxygen. This property may be obtained by coating the electrodes with platinum and/or ruthenium. The term "electrode" means that the material is electrically conductive. The electrode may optionally have a noble metal layer. Such electrodes are known and are described for example in U.S. Pat. Nos. 4,191,618, 4,212,714 and 4,333,805.

The electrodes preferably comprise gas diffusion layers which are in contact with a catalyst layer.

As gas diffusion layers, use is usually made of sheet-like, electrically conductive and acid-resistant structures. These include, for example, graphite fiber papers, carbon fiber papers, woven graphite fabrics and/or papers which have been made conductive by addition of carbon black. A fine distribution of the gas and/or liquid flows is obtained through these layers.

Use may also be made of gas diffusion layers which contain a mechanically stable support material which is impregnated with at least one electrically conductive material, e.g. carbon (for example carbon black). Support materials which are particularly suitable for this purpose include fibers, for example in the form of nonwoven fabrics, papers or woven fabrics, in particular carbon fibers, glass fibers or fibers containing organic polymers, for example polypropylene, polyester (polyethylene terephthalate), polyphenylene sulfide or polyether ketones. Further details concerning such diffusion layers can be found for example in WO 9720358.

The gas diffusion layers preferably have a thickness in the range from 80 μm to 2000 μm, in particular in the range from 100 μm to 1000 μm and particularly preferably in the range from 150 μm to 500 μm.

Furthermore, the gas diffusion layers advantageously have a high porosity. This is preferably in the range from 20% to 80%.

The gas diffusion layers may contain customary additives. These include, inter alia, fluoropolymers such as polytetrafluorethylene (PTFE) and surface-active substances.

According to one particular embodiment, at least one of the gas diffusion layers may consist of a compressible material. Within the context of the present invention, a compressible material is characterized by the property that the gas diffusion layer can be compressed under pressure to half, in particular one third, of its original thickness without losing its integrity.

Gas diffusion layers made of graphite fabric and/or paper which has been made conductive by addition of carbon black generally have this property.

The catalytically active layer contains a catalytically active substance. Such substances include, inter alia, noble metals, in particular platinum, palladium, rhodium, iridium and/or ruthenium. These substances can also be used in the form of alloys with one another. Furthermore, these substances can also be used in alloys with base metals such as Cr, Zr, Ni, Co and/or Ti for example. In addition, the oxides of the previously mentioned noble metals and/or base metals can also be used. According to known methods, the abovementioned metals are usually used on a support material, usually carbon with a high specific surface, in the form of nanoparticles.

According to a particular aspect of the present invention, the catalytically active compounds, i.e. the catalysts, are used in the form of particles which preferably have a size in the range from 1 to 1000 nm, in particular 5 to 200 nm and preferably 10 to 100 nm.

According to one particular embodiment of the present invention, the weight ratio of fluoropolymer to catalyst material, comprising at least one noble metal and optionally one or more support materials, is greater than 0.1, wherein this ratio is preferably in the range from 0.2 to 0.6.

According to one particular embodiment of the present invention, the catalyst layer has a thickness in the range from 1 to 1000 μm, in particular from 5 to 500 μm, preferably from 10 to 300 μm. This value represents a mean which can be determined by measuring the layer thickness in cross section from micrographs which can be obtained using a scanning electron microscope (SEM).

According to one particular embodiment of the present invention, the noble metal content of the catalyst layer is from 0.1 to 10.0 mg/cm$^2$, preferably from 0.3 to 6.0 mg/cm$^2$ and particularly preferably from 0.3 to 3.0 mg/cm$^2$. These values can be determined by elemental analysis of a sheet-like sample.

The catalyst layer is usually not self-supporting but rather is usually applied to the gas diffusion layer and/or the membrane. In this case, part of the catalyst layer may for example diffuse into the gas diffusion layer and/or the membrane, as a result of which transition layers are formed. This may also lead to the catalyst layer being perceived as part of the gas diffusion layer.

According to the invention, the surfaces of the polymer electrolyte membrane are in contact with the electrodes in such a way that the first electrode partially or completely, preferably only partially, covers the front side of the polymer electrolyte membrane and the second electrode partially or completely, preferably only partially, covers the rear side of the polymer electrolyte membrane. Here, the front side and the rear side of the polymer electrolyte membrane refer to the side of the polymer electrolyte membrane which respectively faces toward or away from the observer, wherein the direction of observation is from the first electrode (front), preferably the cathode, towards the second electrode (rear), preferably the anode.

Advantageously, the polymer electrolyte membrane comprises an inner and an outer region, wherein only the front and rear sides of the inner region of the polymer electrolyte membrane are in contact with the electrodes. According to this embodiment, the first electrode at least partially covers the front side of the inner region of the polymer electrolyte membrane and the second electrode at least partially covers the rear side of the inner region of the polymer electrolyte membrane, if the direction of observation is perpendicular to the surface of the polymer electrolyte membrane. The outer region on the other hand is not covered by the electrodes if the direction of observation is perpendicular to the surface of the polymer electrolyte membrane.

For further information concerning membrane electrode units, reference is made to the specialist literature, in particular to patent applications WO 01/18894 A2, DE 195 09 748, DE 195 09 749, WO 00/26982, WO 92/15121 and DE 197 57 492. The disclosure contained in the aforementioned references in respect of the structure and the production of membrane electrode units and also the electrodes, gas diffusion layers and catalysts to be selected also forms part of the description.

According to the present invention, the membrane electrode unit comprises sealing material on the front side and the rear side of the polymer electrolyte membrane. The sealing material may optionally partially cover the electrodes. Advantageously, however, this is not the case and the sealing material is located on areas of the front and rear sides of the polymer electrolyte membrane which are not covered by the electrodes.

Sealing materials which are suitable for the purposes of the present invention are known to the person skilled in the art. They include in particular those materials which have a continuous use temperature of at least 190° C., preferably at least 220° C. and particularly preferably at least 250° C., measured in accordance with MIL-P-46112B, Paragraph 4.4.5.

According to one particular aspect of the present invention, use is made of sealing materials which can be applied by means of thermoplastic processes, preferably injection molding. As sealing materials, use is therefore preferably made of meltable polymers. Particularly preferred meltable polymers include fluoropolymers, in particular poly(tetrafluoroethylene-co-hexafluoropropylene) FEP, polyvinylidene fluoride PVDF, perfluoroalkoxy polymer PFA, poly(tetrafluoroethylene-co-perfluoro(methyl vinyl ether)) MFA, dipolymers of vinylidene fluoride (VF2)/hexafluoropropylene (HFP), terpolymers of vinylidene fluoride (VF2)/hexafluoropropylene (HFP)/tetrafluoroethylene (TFE), copolymers of tetrafluoroethylene (TFE)/propylene (PP) and ethylene (E)/tetrafluoroethylene (TFE)/polyperfluoro(methyl vinyl ether) (PMVE), polyketones, polyether ketones (PEK), polyether ether ketones (PEEK), polyether ether ketone ketones (PEEKK), polyether sulfones (PES), polysulfones (PSU), polyphenylene sulfones (PPSU), polyphenylene sulfides (PPS), polyphenylene oxides (PPO), liquid-crystalline polymers (LCP), polyimides (PI), polyetherimides (PEI), polyamide-imides (PAI), polyphenylene quinoxalines. These polymers are widely commercially available, for example under the trade names Hostafon®, Hyflon®, Teflon®, Dyneon®, Nowoflon®, Viton®, Kadel®, LITE® K.Arlon®, Gatone®, Vitrex®, Imidex®, Vespel®, Fortron®, Ryton®, Tecetron®, Xydar®, Gafone®, Tecason® and Ketron®.

Within the context of the present invention, fluoropolymers are very particularly preferred as sealing materials.

According to the present invention, the polymer electrolyte membrane has one or more cut-outs, wherein the sealing material on the front side of the polymer electrolyte membrane is in contact with the sealing material on the rear side of the polymer electrolyte membrane, preferably through the at least one cut-out.

Advantageously, the polymer electrolyte membrane comprises one or more cut-outs which are partially or completely filled with sealing material, wherein the sealing material in the at least one cut-out connects the sealing material on the front side of the polymer electrolyte membrane to the sealing material on the rear side of the polymer electrolyte membrane, preferably in an integral manner. The term "integral" means in this connection that all of the sealing material is connected in one piece, and accordingly forms just a single seal which, if it can be removed at all, can be removed only in its entirety without destroying the seal.

The shape and size and number of the cut-outs can in principle be selected at will. The shape of the cut-outs may for example be semicircular, circular, oval, square, or star-shaped. Furthermore, the polymer electrolyte membrane may comprise for example a large number of relatively small cut-outs or a few relatively large cut-outs. However, it has proven to be advantageous if the at least one cut-out is designed as a channel which preferably runs perpendicular to the surface of the polymer electrolyte membrane, i.e. in the viewing direction when the direction of observation is from the first electrode (front), preferably the cathode, towards the second electrode (rear), preferably the anode.

Furthermore, the at least one cut-out preferably has the shape of a hole, wherein the front and rear sides of the hole are preferably completely covered with sealing material. The shape of the holes can in principle be selected at will. Said shape may for example be circular, oval, square or star-shaped.

Advantageously, the at least one cut-out is arranged in the outer region of the polymer electrolyte membrane.

Furthermore, better sealing can be achieved if cut-outs are provided at regular intervals in the polymer electrolyte membrane, so that the sealing material bears in a sealing manner against the front and rear sides of the polymer electrolyte membrane. In this case, good adhesion of the sealing material to the surface of the polymer electrolyte membrane is not absolutely necessary.

The sealing material is intended to seal off the fuel cell during operation of the membrane electrode unit, in order thus to prevent in the best way possible any escape of reaction fluids and/or solvents from the fuel cell. For this purpose, the sealing material on the front side and/or the rear side of the polymer electrolyte membrane, preferably on the front side and the rear side of the polymer electrolyte membrane, is in contact with electrically conductive bipolar plates which are typically provided with flow field channels on the sides facing the electrodes, in order to allow the distribution of reactant fluids. The bipolar plates are usually made from graphite or from conductive, heat-resistant plastic.

In collaboration with the bipolar plates, the sealing material generally seals off the gas spaces from the outside. Moreover, the sealing material generally also seals off the gas spaces between anode and cathode. It has thus surprisingly been found that an improved sealing concept may lead to a fuel cell with an increased service life.

For this reason, the sealing material is preferably designed in such a way that at least one, preferably two, bipolar plates can be placed in a sealing manner against the membrane electrode unit according to the invention. The sealing effect can be increased by compressing the assembly consisting of bipolar plate(s) and membrane electrode unit according to the invention.

In order to further improve the sealing effect, the contact area where the sealing material on the front side of the polymer electrolyte membrane is in contact with the sealing material on the rear side of the polymer electrolyte membrane, based on the total surface area of the at least one cut-out, is preferably as large as possible. It is advantageously in the range from 25.0% to 100.0%, preferably in the range from 50.0% to 100.0%, in particular in the range from 75.0% to 100.0%, in each case based on the total surface area of the at least one cut-out. Contact area here means the area over which the sealing material on the front side of the polymer electrolyte membrane is in contact with the sealing material on the rear side of the polymer electrolyte membrane. The surface area of a cut-out is determined perpendicular to the surface of the polymer electrolyte membrane. Should the surface areas of a cut-out on the front side and on the rear side differ from one another, the smaller value is used as a basis here.

According to a further aspect of the present invention, it has proven to be extremely advantageous if the contact area of the sealing material on the front side of the polymer electrolyte membrane and of the sealing material on the rear side of the polymer electrolyte membrane has a hole in the interior. Through this hole, gases for example can be passed through the membrane electrode unit without impairing the functionality of the membrane electrode unit.

The following figures serve to further illustrate the present invention, without this being intended to restrict the concept of the invention in any way.

IN THE FIGURES

Figure 2:
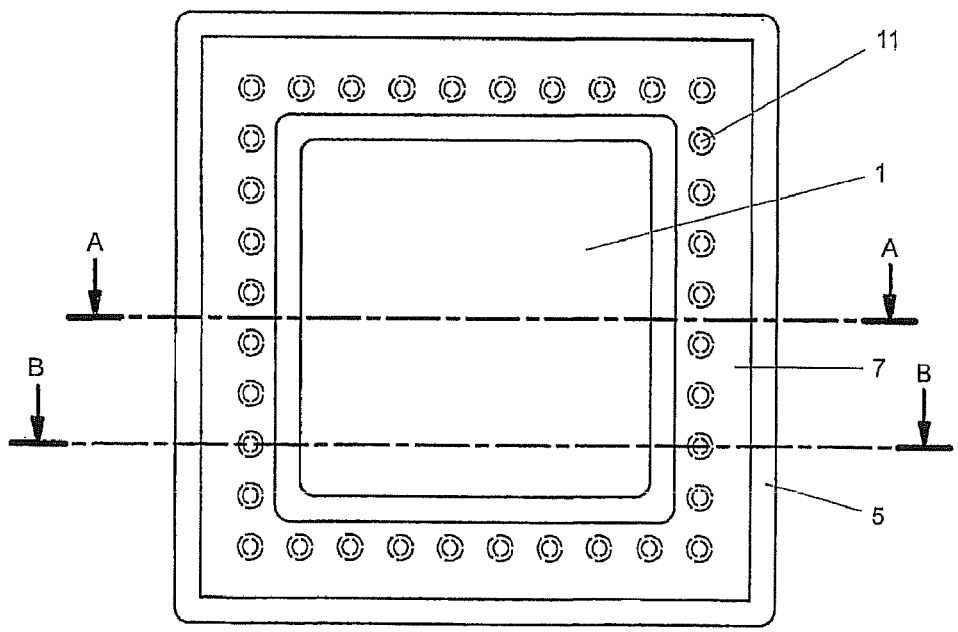
Figure 3:
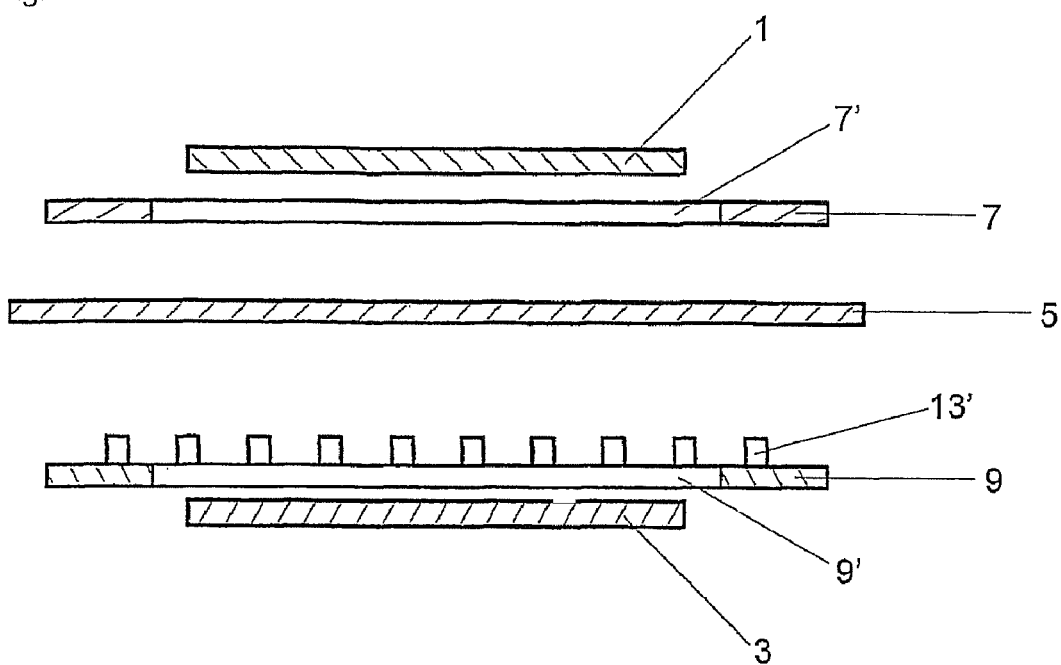
Figure 4:
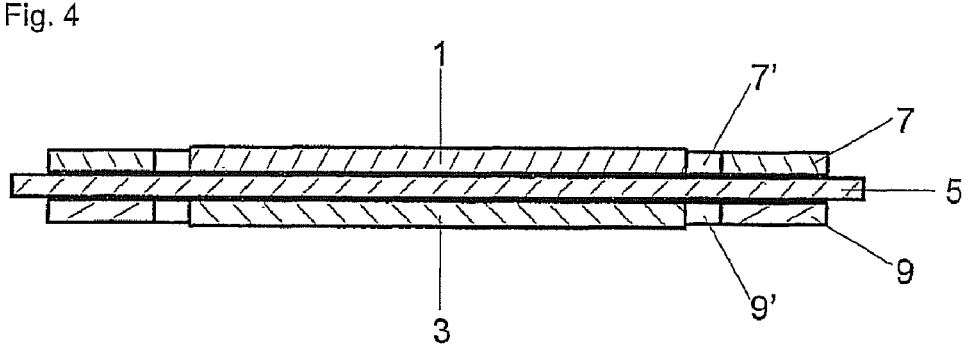
Figure 5:
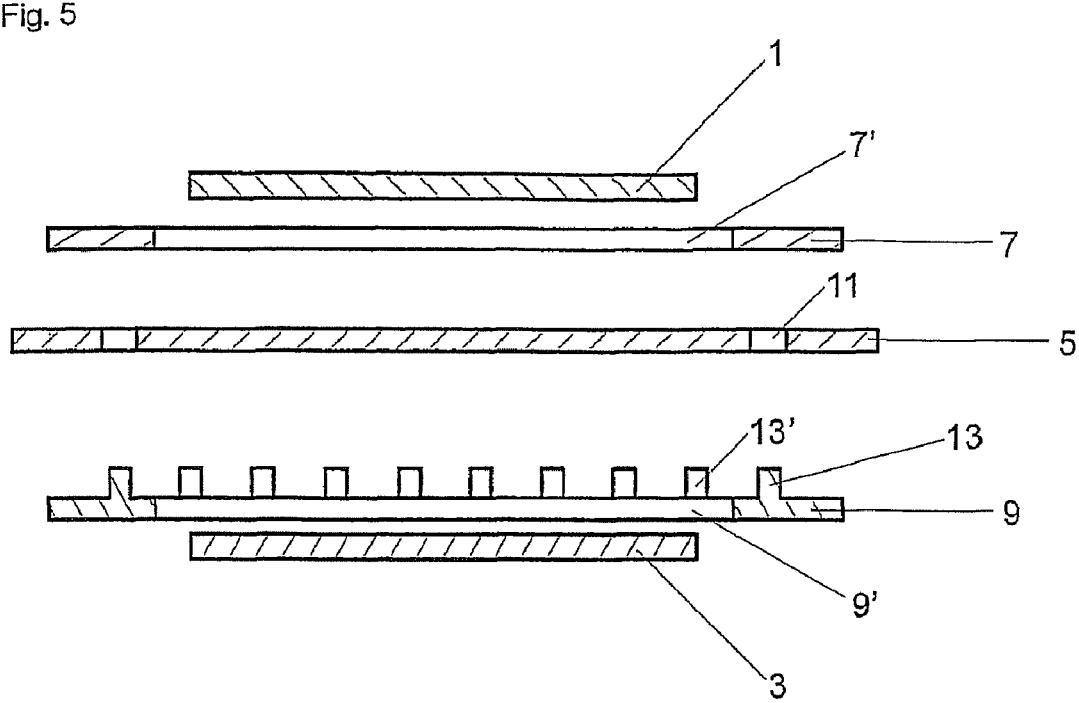
Figure 6:
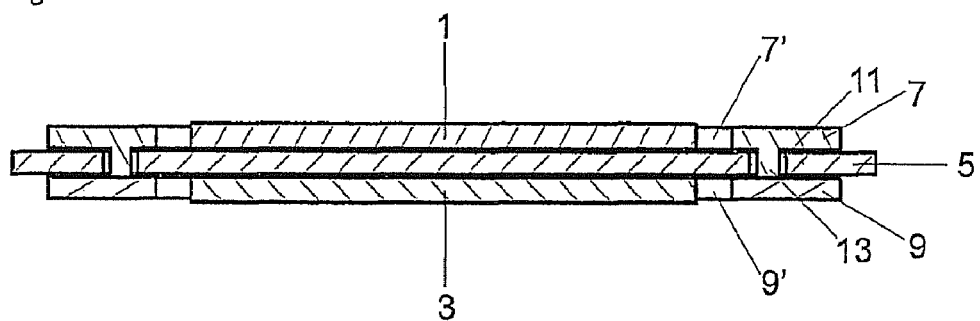

FIG. 1 shows a perspective exploded view of a preferred embodiment of the membrane electrode unit according to the invention FIG. 2 shows a plan view of a preferred embodiment of a membrane electrode unit according to the invention FIG. 3 shows a first side view of a preferred embodiment of the membrane electrode unit according to the invention, as an exploded cross section FIG. 4 shows a second side view of a preferred embodiment of the membrane electrode unit according to the invention, as a cross section FIG. 5 shows a third side view of a preferred embodiment of the membrane electrode unit according to the invention, as an exploded cross section FIG. 6 shows a fourth side view of a preferred embodiment of the membrane electrode unit according to the invention, as a cross section.

The preferred embodiment of the present invention which is shown in FIG. 1 comprises two electrochemically active electrodes (1, 3) separated by a polymer electrolyte membrane (5). The surfaces of the polymer electrolyte membrane are in contact with the electrodes (1, 3) in such a way that the first electrode (1) partially covers the front side (visible surface) of the polymer electrolyte membrane (5) and the second electrode (3) partially covers the rear side (not visible) of the polymer electrolyte membrane (5).

Hereinbelow, the region of the front and rear sides which is covered by the electrodes (1, 3) will be referred to as the inner region of the polymer electrolyte membrane (5) and the region of the polymer electrolyte membrane (5) which is not covered by the electrodes will be referred to as the outer region.

The membrane electrode unit further comprises sealing material (7, 9) on uncovered surfaces of the front and rear sides of the polymer electrolyte membrane (5), wherein the sealing material (7) covers the front side of the outer region of the polymer electrolyte membrane (5) and the sealing material (9) covers the rear side of the outer region of the polymer electrolyte membrane (5).

The polymer electrolyte membrane (5) comprises a plurality of cut-outs (11), which in the present case are designed in the form of holes and are arranged at regular intervals in the outer region.

The sealing material (9) on the rear side of the polymer electrolyte membrane (5) has on its front side, i.e. on the side facing the polymer electrolyte membrane (5), a plurality of protrusions (13) which also consist of sealing material. The shape, position and arrangement of the protrusions (13) on the sealing material (9) is such that the protrusions (13) fit through the cut-outs (11) in the polymer electrolyte membrane (5) and are thus able to connect the sealing material (9) on the rear side of the polymer electrolyte membrane (5) to the sealing material (7) on the front side of the polymer electrolyte membrane (5) through the cut-outs (11). The protrusions (13) therefore have in plan view a main surface area which is smaller than or equal to the main surface area of the cut-outs (11). Furthermore, the height of the protrusions (13) is at least equal to the thickness (perpendicular) of the polymer electrolyte membrane (5), so that the protrusions can connect the sealing material (7, 9) on the two sides of the polymer electrolyte membrane (5). Moreover, the arrangement of the protrusions (13) on the front side of the sealing material (9) corresponds to the arrangement of the cut-outs (11) in the polymer electrolyte membrane (5).

FIG. 2 shows the membrane electrode unit again in plan view. The front side of the polymer electrolyte membrane (5) is covered by the first electrode (1). The second electrode (3; not shown) is located symmetrically with respect to the polymer electrolyte membrane (5), on the rear side thereof. The surface of the polymer electrolyte membrane (5) which is covered by the first electrode (1) is thus the inner region of the polymer electrolyte membrane (5) and the surface of the polymer electrolyte membrane (5) which is not covered by the first electrode (1) is the outer region of the polymer electrolyte membrane (5).

The cut-outs (11) in the polymer electrolyte membrane (5), which are arranged annularly around the first electrode (1) in the outer region and are designed in the form of uniformly arranged holes, are covered by the sealing material (7).

The sealing material (7) is preferably applied to the front side of the polymer electrolyte membrane (5) in such a way that it is not in contact with the electrode (1) at any point. The gap between the electrode (1) and the sealing material (7) serves to prevent, as far as possible, the build-up of mechanical stresses during heating, which stresses may possibly build up as a result of different thermal expansion coefficients of the electrode and the sealing material.

Although not visible in FIG. 2, for the same reasons the sealing material (9) is preferably applied to the rear side of the polymer electrolyte membrane (5) in such a way that it is not in contact with the electrode (3) at any point.

FIGS. 3 (exploded view) and 4 show cross sections through the membrane electrode unit, wherein the section is taken perpendicular to the surface of the polymer electrolyte membrane (5) along a plane A which cuts through the inner and outer region of the polymer electrolyte membrane (5) but no cut-outs (11) in the polymer electrolyte membrane (5). The course of the plane A is shown in FIG. 2.

In FIG. 3, the sealing material (7, 9) accordingly has in the center, above and below the polymer electrolyte membrane (5), cut-outs which can receive the electrodes (1, 3). It is also possible to see the sealing material (7', 9') and the protrusions (13') which are located behind the plane of the drawing (non-hatched elements).

During assembly, the cut-out in the sealing material (7) on the front side of the polymer electrolyte membrane (5) receives the first electrode (1) and the cut-out in the sealing material (9) on the rear side of the polymer electrolyte membrane (5) receives the second electrode (3). The elements (7', 9', 13') located behind the plane of the drawing are largely hidden by the electrodes (1, 3) and the sealing material (7). Only in the regions between the first electrode (1) and the sealing material (7) and between the second electrode (3) and the sealing material (9) is it possible to see sealing material (7', 9') located behind the plane of the drawing.

FIGS. 5 (exploded view) and 6 show cross sections through the membrane electrode unit, wherein the section is taken perpendicular to the surface of the polymer electrolyte membrane (5) along a plane B which cuts through the inner and outer region of the polymer electrolyte membrane (5) and two cut-outs (11) in the polymer electrolyte membrane (5) which, viewed along the plane B, are separated from one another by the inner region. The course of the plane B is shown in FIG. 2.

In FIG. 5, the sealing material (7, 9) accordingly has in the center, above and below the polymer electrolyte membrane (5), cut-outs which can receive the electrodes (1, 3). Here, the sealing material (9) has protrusions (13) and the polymer electrolyte membrane (5) has cut-outs (11) which can receive the protrusions (13). It is also possible to see the sealing material (7', 9') which is located behind the plane of the drawing (non-hatched elements).

During assembly, the cut-out in the sealing material (7) on the front side of the polymer electrolyte membrane (5) receives the first electrode (1) and the cut-out in the sealing material (9) on the rear side of the polymer electrolyte membrane (5) receives the second electrode (3). Furthermore, the cut-outs (11) receive the protrusions (13), so that the sealing material (7) on the front side of the polymer electrolyte membrane (5) is connected in an integral manner to the sealing material (9) on the rear side of the polymer electrolyte membrane (5) via the protrusions (13). The elements (7', 9') located behind the plane of the drawing are largely hidden by the electrodes (1, 3). Only in the regions between the first electrode (1) and the sealing material (7) and between the second electrode (3) and the sealing material (9) is it possible to see sealing material (7', 9') located behind the plane of the drawing.

The production of the membrane electrode unit according to the invention is obvious to the person skilled in the art. Usually the various constituents of the membrane electrode unit are placed on top of one another and joined to one another by pressure and temperature, wherein usually lamination is carried out at a temperature in the range from 10 to 300° C., in particular 20° C. to 200° C., and at a pressure in the range from 1 to 1000 bar, in particular from 3 to 300 bar.

According to a first preferred embodiment of the invention, the production of the membrane electrode unit comprises the following steps i) the polymer electrolyte membrane, preferably areas of the polymer electrolyte membrane which are not covered by the electrodes, is provided with at least one cut-out at one or more locations, ii) the at least one cut-out is partially or completely filled with sealing material, and iii) the sealing material is applied to the front and rear sides of the polymer electrolyte membrane on areas which are not covered by the electrodes, wherein steps ii) and iii) take place in such a way that the sealing material in the at least one cut-out connects the sealing material on the front side of the polymer electrolyte membrane to the sealing material on the rear side of the polymer electrolyte membrane, preferably in an integral manner.

Step i) can be carried out in a manner known per se, although in the present context cutting and/or punching of the at least one cut-out has proven to be particularly advantageous. Furthermore, the polymer electrolyte membrane is preferably provided with cut-outs perpendicular to the surface of the polymer electrolyte membrane.

The filling of the at least one cut-out with sealing material according to step ii) and the application of the sealing material according to step iii) can also be carried out in a manner known per se, as long as the aim is achieved that the sealing material in the at least one cut-out connects the sealing material on the front side of the polymer electrolyte membrane to the sealing material on the rear side of the polymer electrolyte membrane, preferably in an integral manner. The sealing material is therefore preferably applied to the front and rear sides of the polymer electrolyte membrane in such a way that it at least partially, preferably completely, covers the upper and lower end of the cut-out. If the polymer electrolyte membrane has a plurality of cut-outs, it may in some circumstances be sufficient if the sealing material of the front side and of the rear side are connected to one another only through some of the cut-outs.

The application of the sealing material to the polymer electrolyte membrane and the filling of the at least one cut-out preferably takes place by means of thermoplastic processes in the viscoelastic state, wherein injection molding methods have proven to be particularly advantageous for this purpose. The procedure here is advantageously as follows:

Firstly, molds are produced for the front side and the rear side of the polymer electrolyte membrane, in which one or more cut-outs, preferably channels which are open in the upward direction, are provided for the sealing material. The shape, size and position of the cut-outs is selected in such a way that a cell which is sealed from the outside in the best possible manner is obtained with the desired size of the contact area between the electrodes and the polymer electrolyte membrane. Advantageously, the layout of the cut-outs on the two molds is in the form of an image and a mirror-image.

In parallel with this, a membrane electrode unit is prepared which comprises two electrochemically active electrodes separated by a polymer electrolyte membrane, wherein the surfaces of the polymer electrolyte membrane are in contact with the electrodes in such a way that the first electrode partially or completely, preferably only partially, covers the front side of the polymer electrolyte membrane and the second electrode partially or completely, preferably only partially, covers the rear side of the polymer electrolyte membrane. The polymer electrolyte membrane is furthermore provided with one or more cut-outs which advantageously connect surfaces of the front and rear sides of the polymer electrolyte membrane which are not covered by the electrodes to one another.

In order to produce the membrane electrode unit according to the invention:

a) the at least one cut-out provided in the mold of the rear side is filled with sealing material melt, b) the previously described membrane electrode unit is placed on the mold in such a way that the sealing material melt is in contact with the rear side of the polymer electrolyte membrane, preferably with the surface of the rear side of the polymer electrolyte membrane which is not covered by the electrode, and the lower end of the at least one cut-out in the polymer electrolyte membrane is in contact with the sealing material melt, c) the at least one cut-out is at least partially filled with sealing material melt, d) the at least one cut-out provided in the mold of the front side is filled with sealing material melt, e) the mold of the front side is placed on the front side of the polymer electrolyte membrane in such a way that the sealing material melt in the mold of the front side is in contact with the front side of the polymer electrolyte membrane, preferably with the surface of the front side of the polymer electrolyte membrane which is not covered by the electrode, and the upper end of the at least one cut-out in the polymer electrolyte membrane is in contact with the sealing material melt of the mold of the front side, f) the assembly consisting of the mold of the rear side, the membrane electrode unit and the mold of the front side is cooled, preferably under pressure, in such a way that the sealing material melt solidifies.

After cooling and removing of the molds, the finished membrane electrode unit (MEU) is ready for operation and can be used in a fuel cell.

According to a second preferred embodiment of the present invention, in order to produce the membrane electrode unit according to the invention the sealing material is applied to the polymer electrolyte membrane by means of an extrusion process. Once again, a membrane electrode unit is prepared which comprises two electrochemically active electrodes separated by a polymer electrolyte membrane, wherein the surfaces of the polymer electrolyte membrane are in contact with the electrodes in such a way that the first electrode partially or completely, preferably only partially, covers the front side of the polymer electrolyte membrane and the second electrode partially or completely, preferably only partially, covers the rear side of the polymer electrolyte membrane. The polymer electrolyte membrane is furthermore provided with one or more cut-outs which advantageously connect surfaces of the front and rear sides of the polymer electrolyte membrane which are not covered by the electrodes to one another.

In order to apply the sealing material, the latter is preferably extruded and deposited on the front and rear sides of the polymer electrolyte membrane in such a way that the sealing material at least partially covers at least one cut-out from both sides. The assembly consisting of sealing material and membrane electrode unit is then compressed in such a way that the sealing material on the front side of the polymer electrolyte membrane is in contact with the sealing material on the rear side of the polymer electrolyte membrane.

According to a third preferred embodiment of the present invention, the production of the membrane electrode unit according to the invention comprises the steps that a membrane electrode unit is prepared which comprises two electrochemically active electrodes separated by a polymer electrolyte membrane, wherein the surfaces of the polymer electrolyte membrane are in contact with the electrodes in such a way that the first electrode partially or completely, preferably only partially, covers the front side of the polymer electrolyte membrane and the second electrode partially or completely, preferably only partially, covers the rear side of the polymer electrolyte membrane.

The sealing material is then applied to the front and rear sides of the polymer electrolyte membrane and the assembly consisting of sealing material and membrane electrode unit is provided with at least one cut-out, preferably with at least one hole, which runs through the sealing material on the front and rear sides of the polymer electrolyte membrane and through the polymer electrolyte membrane. The at least one cut-out is at least partially filled with sealing material, and in this way the sealing material on the front side of the polymer electrolyte membrane is connected to the sealing material on the rear side of the polymer electrolyte membrane. Advantageously, the application of the sealing material takes place simultaneously with the production of the at least one cut-out, in that the at least one cut-out is formed by means of an internally hollow mold and, upon removal of the mold, the resulting at least one cut-out is at least partially filled directly with sealing material by passing sealing material into the cut-out through the interior of the mold.

According to a fourth preferred embodiment of the present invention, the production of the membrane electrode unit according to the invention comprises the steps that a membrane electrode unit is prepared which comprises two electrochemically active electrodes separated by a polymer electrolyte membrane, wherein the surfaces of the polymer electrolyte membrane are in contact with the electrodes in such a way that the first electrode partially or completely, preferably only partially, covers the front side of the polymer electrolyte membrane and the second electrode partially or completely, preferably only partially, covers the rear side of the polymer electrolyte membrane.

The polymer electrolyte membrane is then placed in a suitable mold and provided with at least one cut-out, preferably with at least one hole, and the sealing material is then applied, preferably by means of an injection molding process, to the front and rear sides of the polymer electrolyte membrane. Advantageously, the application of the sealing material takes place simultaneously with the production of the at least one cut-out, in that the at least one cut-out is formed by means of an internally hollow mold and, upon removal of the mold, the resulting at least one cut-out is at least partially filled directly with sealing material by passing sealing material into the cut-out through the interior of the mold.

According to a fifth preferred embodiment of the present invention, the production of the membrane electrode unit according to the invention comprises the steps that a membrane electrode unit is prepared which comprises two electrochemically active electrodes separated by a polymer electrolyte membrane, wherein the surfaces of the polymer electrolyte membrane are in contact with the electrodes in such a way that the first electrode partially or completely, preferably only partially, covers the front side of the polymer electrolyte membrane and the second electrode partially or completely, preferably only partially, covers the rear side of the polymer electrolyte membrane.

The polymer electrolyte membrane is then provided with at least one cut-out, preferably with at least one hole, and then pre-shaped sealing material is applied to the front and rear sides of the polymer electrolyte membrane. In this case, the sealing material applied to the rear side has, on its side facing the polymer electrolyte membrane, one or more protrusions which also consist of sealing material. The shape, position and arrangement of the protrusions on the sealing material is such that the protrusions fit through the cut-outs in the polymer electrolyte membrane and are thus able to connect the sealing material on the rear side of the polymer electrolyte membrane to the sealing material on the front side of the polymer electrolyte membrane through the cut-outs. Advantageously, in a further step, the protrusions of the sealing material on the rear side of the polymer electrolyte membrane are then connected to the sealing material on the front side of the polymer electrolyte membrane, preferably by means of plastic welding.

Within the context of this embodiment, according to the invention it has proven to be particularly advantageous if the sealing material on the front side of the polymer electrolyte membrane has one or more cut-outs, preferably at least one hole, which can receive the protrusions of the sealing material on the rear side of the polymer electrolyte membrane. The membrane electrode unit is then preferably assembled in such a way that the protrusions of the sealing material are inserted through the polymer electrolyte membrane and the cut-outs in the sealing material on the front side of the polymer electrolyte membrane, and the sealing material on the front side of the polymer electrolyte membrane is connected, preferably welded, to the protrusions of the sealing material on the rear side of the polymer electrolyte membrane.

In a particularly surprising manner, it has been found that membrane electrode units according to the invention can be stored or shipped without any problem due to their dimensional stability at fluctuating ambient temperatures and levels of humidity. Even after relatively long periods of storage or after being shipped to locations with very different climatic conditions, the dimensions of the membrane electrode units are suitable for incorporation in fuel cell stacks. The membrane electrode unit thus no longer needs to be conditioned on site for external installation, which simplifies production of the fuel cell and saves time and money.

One advantage of preferred membrane electrode units is that they allow operation of the fuel cell at temperatures above 120° C. This applies in respect of gaseous and liquid fuels, such as hydrogen-containing gases for example, which are produced for example in an upstream reformation step from hydrocarbons. As the oxidant, it is possible to use for example oxygen or air.

A further advantage of preferred membrane electrode units is that they have a high tolerance to carbon monoxide during operation above 120° C. even with pure platinum catalysts, i.e. without any further alloy constituent. At temperatures of 160° C., for example more than 1% CO can be contained in the combustion gas without this leading to a marked reduction in performance of the fuel cell.

Preferred membrane electrode units can be operated in fuel cells without having to wet the combustion gases and oxidants, despite the possible high operating temperatures. The fuel cell nevertheless operates in a stable manner, and the membrane does not lose its conductivity. This simplifies the entire fuel cell system and brings additional cost savings since the water cycle is simplified. This also results in an improvement in behavior at temperatures below 0° C. of the fuel cell system.

Preferred membrane electrode units surprisingly make it possible for the fuel cell to be cooled to room temperature and below without any problem and then to be operated again without any loss in performance. By contrast, conventional fuel cells based on phosphoric acid sometimes have to be kept at a temperature above 80° C. even after switch-off of the fuel cell system, in order to prevent irreversible damage.

Furthermore, the preferred membrane electrode units of the present invention have a very high long-term stability. It has been found that a fuel cell according to the invention can be operated continuously with dry reaction gases at temperatures of more than 120° C. for long periods of time, e.g. more than 5000 hours, without any noticeable degradation in performance. The power densities which can be achieved in this case are very high even after such a long time.

Even after a long time, for example more than 5000 hours, the fuel cells according to the invention still have a high open circuit voltage which after this time is preferably at least 2000 mV. In order to measure the open circuit voltage, a fuel cell is operated without current with a hydrogen flow on the anode and an air flow on the cathode. The measurement is carried out by switching the fuel cell from a current of 0.2 A/cm$^2$ to the powerless state and then recording the open circuit voltage for 52 minutes. The value after 5 minutes is the corresponding rest potential. The measured values of the open circuit voltage are valid for a temperature of 160° C. Furthermore, after this time, the fuel cell preferably exhibits a low gas crossover. In order to measure the crossover, the anode side of the fuel cell is operated with hydrogen (5 l/h) and the cathode is operated with nitrogen (5 l/h). The anode serves as the reference electrode and counterelectrode. The cathode serves as the working electrode. The cathode is placed at a potential of 0.5 V and the hydrogen diffusing through the membrane is oxidized at the cathode in a manner limited by mass transport. The resulting current is a measure of the hydrogen permeation rate. The current is <3 mA/cm$^2$, preferably <2 mA/cm$^2$, particularly preferably <1 mA/cm$^2$ in a 50 cm$^2$ cell. The measured values of the H$_2$ crossover open circuit voltage are valid for a temperature of 160° C.

Furthermore, the membrane electrode units according to the invention can be produced in a simple and cost-effective manner.

For further information concerning membrane electrode units, reference is made to the specialist literature, in particular to patents U.S. Pat. Nos. 4,191,618, 4,212,714 and 4,333,805. The disclosure contained in the aforementioned references [U.S. Pat. Nos. 4,191,618, 4,212,714 and 4,333,805] in respect of the structure and the production of membrane electrode units and also the electrodes, gas diffusion layers and catalysts to be selected also forms part of the description.

The invention claimed is:
1. A membrane electrode unit comprising:
a) two electrochemically active electrodes;
the electrochemically active electrodes being a first electrode and a second electrode;
the electrochemically active electrodes are separated by a polymer electrolyte membrane comprising a polyazole doped with an acid;
the polymer electrolyte membrane having a front side and a rear side;
the front side of the polymer electrolyte membrane is in contact with the first electrode;
wherein the first electrode covering partially or completely the front side of the polymer electrolyte membrane;
the rear side of the polymer electrolyte membrane is in contact with the second electrode;
wherein the second electrode covering partially or completely the rear side of the polymer electrolyte membrane;
the polymer electrolyte membrane having one or more cut-outs;
b) a sealing material;
the sealing material being on the front side and the rear side of the polymer electrolyte membrane, the rear side sealing material having a plurality of protrusion, each protrusion having a height at least as great as a thickness of the membrane;
wherein the protrusions of the sealing material on the rear side of the polymer electrolyte membrane are in contact with the sealing material on the front side of the polymer electrolyte membrane;
characterized in that the polymer electrolyte membrane having one or more cut-outs and the protrusions of the sealing material on the rear side of the polymer electrolyte membrane are in contact with the sealing material on the front side of the polymer electrolyte membrane through the cut-outs, and the first electrode and the sealing material on the front side of the polymer electrolyte membrane defining a gap therebetween, and the second electrode and the sealing material on the rear side of the polymer electrolyte membrane defining a gap therebetween.

2. The membrane electrode unit according to claim 1, characterized in that the at least one cut-out is designed in the form of a hole through the polymer electrolyte membrane.

3. The membrane electrode unit according to claim 1 characterized in that the polymer electrolyte membrane comprises an inner region and an outer region, wherein only the front and rear sides of the inner region of the polymer electrolyte membrane are in contact with the electrodes.

4. The membrane electrode unit according to claim 3, characterized in that the at least one cut-out is arranged in the outer region of the polymer electrolyte membrane.

5. The membrane electrode unit according to claim 1 characterized in that the sealing material is a thermoplastically processable material.

6. The membrane electrode unit according to claim 1 characterized in that the sealing material is a fluoropolymer.

7. The membrane electrode unit according to claim 1, characterized in that the polymer electrolyte membrane is doped with phosphoric acid.

8. The membrane electrode unit according to claim 7, characterized in that the concentration of the phosphoric acid is at least 50% by weight.

9. The membrane electrode unit according to claim 8 characterized in that the degree of doping is between 3 and 50.

10. The membrane electrode unit according to claim 7 characterized in that the degree of doping is between 3 and 50.

11. The membrane electrode unit according to claim 1 characterized in that the polymer electrolyte membrane can be obtained by a method comprising the following steps A) mixing one or more aromatic tetraamino compounds with one or more aromatic carboxylic acids and/or esters thereof containing at least two acid groups per carboxylic acid monomer, or mixing one or more aromatic and/or heteroaromatic diaminocarboxylic acids in polyphosphoric acid to form a solution and/or dispersion, B) applying a layer using the mixture according to step A) to a support or to an electrode, C) heating the sheet-like structure/layer obtainable according to step B) under an inert gas to temperatures of up to 350° C., to form the polyazole polymer, D) treating the membrane formed in step C) until it is self-supporting.

12. The membrane electrode unit according to claim 11 characterized in that the degree of doping is between 3 and 50.

13. The membrane electrode unit according to claim 1 characterized in that the polymer electrolyte membrane comprises polymers obtainable by polymerization of monomers containing phosphonic acid groups and/or monomers containing sulfonic acid groups.

14. The membrane electrode unit according to claim 1 characterized in that at least one of the electrodes is made of a compressible material.

15. A fuel cell comprising at least one membrane electrode unit according to claim 1.

* * * * *